(12) United States Patent
McMillen

(10) Patent No.: US 7,780,233 B2
(45) Date of Patent: Aug. 24, 2010

(54) BELT EXTENSION APPARATUS

(75) Inventor: Robert J. McMillen, Tecumseh (CA)

(73) Assignee: Schukra of North America, Ltd., Lakeshore-Tecumseh (CA)

( * ) Notice: Subject to any disclaimer, the term of this patent is extended or adjusted under 35 U.S.C. 154(b) by 854 days.

(21) Appl. No.: 11/421,962

(22) Filed: Jun. 2, 2006

(65) Prior Publication Data

US 2006/0273643 A1 Dec. 7, 2006

Related U.S. Application Data

(60) Provisional application No. 60/686,579, filed on Jun. 2, 2005.

(51) Int. Cl.
*A47C 7/46* (2006.01)

(52) U.S. Cl. .................................. 297/284.4

(58) Field of Classification Search ............. 297/284.4, 297/284.8, 284.7, 284.5; 24/31 F, 265 C, 24/265 EC, 265 H, 265 A, 265 R
See application file for complete search history.

(56) References Cited

U.S. PATENT DOCUMENTS

| | | | |
|---|---|---|---|
| 3,137,372 A * | 6/1964 | Nash | ........................... 403/206 |
| 3,258,259 A | 6/1966 | Bohlin | |
| 4,155,592 A | 5/1979 | Tsuda et al. | |
| 4,309,058 A | 1/1982 | Barley | |
| 4,462,635 A | 7/1984 | Lance | |
| 5,224,757 A | 7/1993 | Geitz et al. | |
| 5,482,353 A | 1/1996 | Lance | |
| 5,507,559 A | 4/1996 | Lance | |
| 5,518,294 A | 5/1996 | Ligon, Sr. et al. | |
| 5,685,606 A | 11/1997 | Lance | |
| 5,697,662 A * | 12/1997 | Leftwich | ..................... 296/63 |
| 5,716,098 A | 2/1998 | Lance | |
| 5,769,490 A | 6/1998 | Falzon | |
| 5,788,328 A | 8/1998 | Lance | |
| 5,797,652 A | 8/1998 | Darbyshire | |
| 5,860,700 A | 1/1999 | Lance | |
| 5,954,399 A * | 9/1999 | Hong | ...................... 297/284.4 |
| 6,003,941 A | 12/1999 | Schuster, Sr. et al. | |
| 6,152,531 A | 11/2000 | Deceuninck | |

(Continued)

FOREIGN PATENT DOCUMENTS

CA 2450735 A1 1/2003

(Continued)

*Primary Examiner*—Milton Nelson, Jr.
(74) *Attorney, Agent, or Firm*—Grant D. Kang; Kang Intellectual Property Law, LLC

(57) ABSTRACT

A belt-type lumbar support includes a belt having first and second end portions. A first attachment tab is located at the first end portion, and a second attachment tab is located at the second end portion. A spring is located at the first end portion and is connected to the first attachment tab. A cable is located at the second end portion and is connected to the second attachment tab. A first belt extension is located at the first end portion and proximate to the first attachment tab and has a first belt extension tongue, wherein at least a portion of the belt extension tongue extends over the spring. A second belt extension is located at the second end portion and proximate to the second attachment tab and has a second belt extension tongue, wherein at least a portion of the second belt extension tongue extends over the cable.

18 Claims, 31 Drawing Sheets

U.S. PATENT DOCUMENTS

| | | |
|---|---|---|
| 6,254,186 B1 | 7/2001 | Falzon |
| 6,394,546 B1 | 5/2002 | Knoblock et al. |
| 6,402,246 B1 | 6/2002 | Mundell |
| 6,412,868 B1 | 7/2002 | Kuster et al. |
| 6,471,294 B1 | 10/2002 | Dammermann et al. |
| 6,644,740 B2 | 11/2003 | Holst et al. |
| 6,918,634 B2 * | 7/2005 | Elliot ................ 297/284.4 |
| 6,991,288 B2 | 1/2006 | Farquhar et al. |
| 7,011,369 B2 | 3/2006 | Massara et al. |
| 7,097,247 B2 * | 8/2006 | Battey et al. ........ 297/284.4 |
| 2006/0152051 A1 | 7/2006 | Colja et al. |

FOREIGN PATENT DOCUMENTS

| | | |
|---|---|---|
| DE | 3619188 C1 | 12/1987 |
| DE | 3620084 A1 | 12/1987 |
| DE | 3817977 A1 | 11/1989 |
| EP | 0296938 B1 | 12/1988 |
| EP | 0420824 B1 | 4/1991 |
| EP | 0518830 B1 | 12/1992 |
| EP | 0540481 B1 | 5/1993 |
| EP | 0582821 B1 | 2/1994 |
| FR | 2596334 A1 | 10/1987 |
| FR | 2765531 A1 | 1/1999 |

* cited by examiner

BELT EXTENSION APPARATUS

CROSS-REFERENCE TO RELATED APPLICATIONS

This application claims priority to U.S. Provisional Application No. 60/686,579 filed on Jun. 2, 2005, which is herein incorporated by reference in its entirety.

BACKGROUND OF THE INVENTION

1. Field of the Invention

The present invention relates generally to vehicle seats and, more particularly, to vehicle seats having a belt-type lumbar support.

2. Related Art

Many different types of lumbar supports have been used in seating systems. Strap or belt-type lumbar supports can be any type of strap, including a belt or wire, and are known to be supported in the seat frame by various means, including springs, hooks, brackets, clips, and wires. Strap lumbar supports are also known to be operated using a number of different actuation devices. Examples of prior art strap lumbar devices can be found in the following references: U.S. Pat. Nos. 3,258,259, 3,273,877, 4,155,592, 5,716,098, EP 0296938, EP 0420824, EP 0540481, CA 2450735, FR 2596334, and FR 2765531.

Strap lumbar devices can usually be distinguished from arching lumbar devices, such as described and illustrated in U.S. Pat. Nos. 6,003,941 and 5,518,294, based on the difference between their respective tensioning elements. The strap lumbar is connected to the seat frame in a manner that the tensioning element, either the strap itself or that supports the strap, must be pulled taut to increase support. In comparison, the tensioning element in the arching lumbar is stiff and can be rotated, pushed or bowed to increase support.

Although the prior art devices have adequately provided lumbar support, some problems still remain. As a first example, the spring or cable of the strap-type lumbar support may wear, dig into, or catch upon the seat back foam causing the seat back foam to prematurely fail. As a second example, the belt-type lumbar support may twist or turn during installation or when in use by a seat occupant. The rotation or twisting of the belt-type lumbar support causes great difficulty in installation and may cause discomfort to the seat occupant.

Modular seat assembly techniques require seat interior components to be designed for ease and speed of assembly. Modular lumbar supports often include vertical extensions. In both assembly and finished use, the extra leverage such extensions place on anchors causes undesirable wear and binding.

Therefore, there is a need in the art for an improved belt-type lumbar support that does not affect the wear characteristics of the seat back foam. Further, there is a need in the art for an improved belt-type lumbar support that is rotationally fixed. Finally, along with the need for strong, economical, compact components in seat design, there is a continuing need in seat assembly procedures to increase the economy, speed and efficiency of component assembly and shipping.

SUMMARY OF THE INVENTION

The invention is a belt extension and flexure that at least partially extends over a tensioning member, such as a cable or a spring, and engages an anchoring location of the seat frame. The belt extension is located in between the tensioning member and a seat back foam of a seat. In this manner, the belt extension prevents the tensioning member from wearing against the seat back foam. The belt extension may be integral with the belt of the belt-type lumbar support or it may be a separate component.

In some embodiments, the belt extension includes a hinge. The hinge may be V-shaped. The hinge extends from the anchor of a tensioning device. The hinge readily flexes in a transverse direction parallel to the tensioning force but resists vertical flexing or twisting. Due to the arrangement of the hinge, the belt-type lumbar support moves toward and away from a seat occupant but is unlikely to twist. In other words, the hinge allows the belt to move in or out but significantly reduces the undesirable ability of the belt to twist or rotate.

Thus, in furtherance of the above goals and advantages, the present invention is, briefly, a lumbar support adapted to mount within a seat frame, the lumbar support comprising: a belt having a first end portion and a second end portion; a first attachment tab located at said a first end portion; a second attachment tab located at said second end portion; a spring located at said first end portion and operatively connected to said first attachment tab; a cable located at said second end portion and operatively connected to said second attachment tab; a first belt extension located at said first end portion and proximate to said first attachment tab, said first belt extension having a first belt extension tongue, wherein at least a portion of said belt extension tongue extends over said spring; and a second belt extension located at said a second end portion and proximate to said second attachment tab, said belt extension having a second belt extension tongue, wherein at least a portion of said second belt extension tongue extends over said cable.

Further, the present invention is, briefly, a seat for a vehicle, the seat comprising: a seat riser mounted in the vehicle; a seat bottom mounted to said seat riser; a seat back mounted to said seat bottom, said seat back including a seat frame; a belt-type lumbar support operatively connected to said seat frame, said belt-type lumbar support having at least one tensioning member and a belt extension that at least partially extends over said at least one tensioning member.

Finally, the present invention is an extension for a lumbar support belt which comprises an attachment tab for attaching the extension to a wire support, a receiver clip attached to the attachment tab, a receiver hole within the hinge portion, and a tongue attached to the attachment tab by a pair of leg portions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
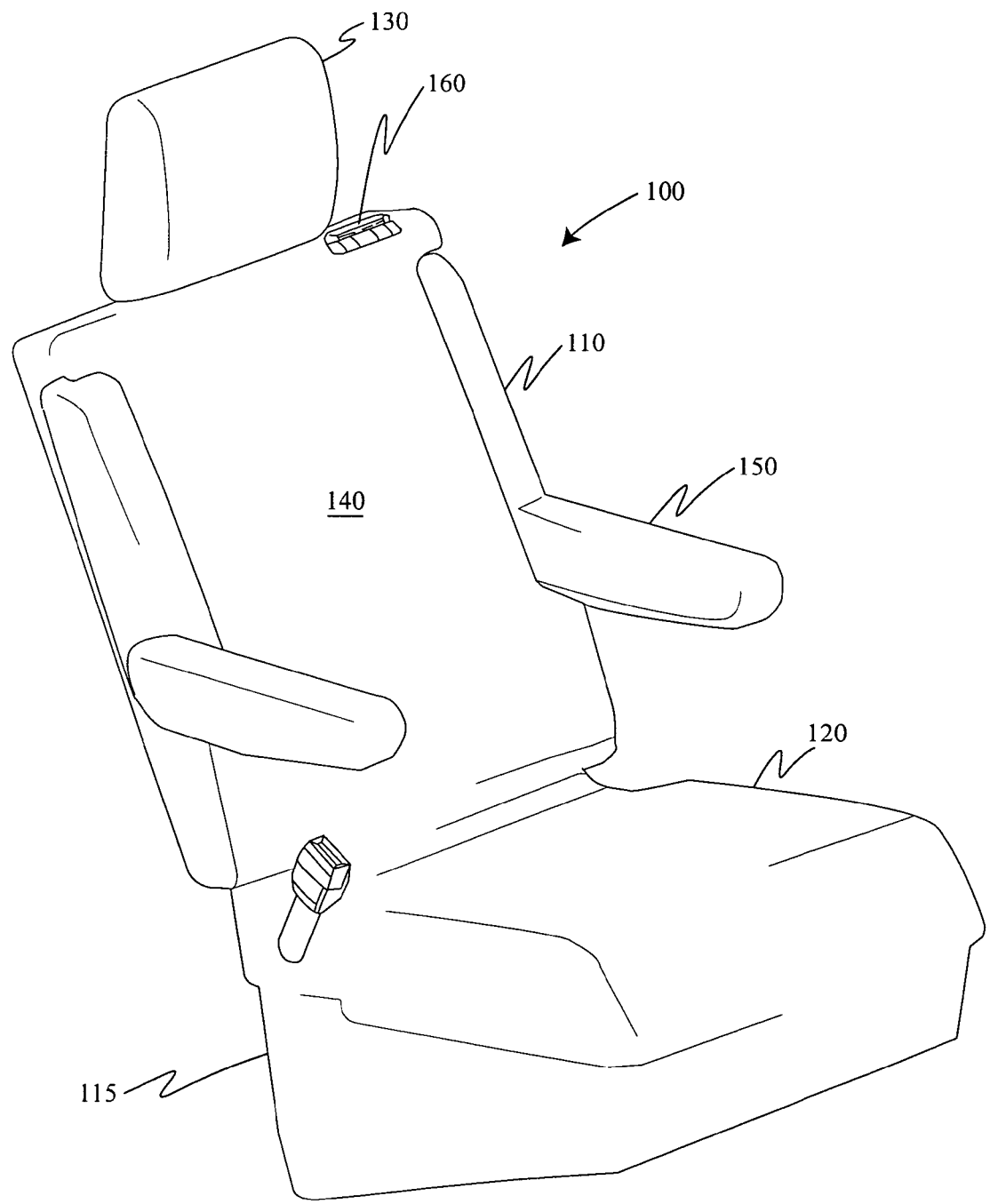
FIG. 1 is a perspective view of a vehicle seat.

FIG. 1 illustrates a seat 100. The seat 100 has a seat back 110 and a seat bottom 120, The seat bottom 120 may be mounted on a seat riser 115 which may be mounted in a vehicle (not shown). The seat 100 optionally may include a head rest 130, arm rests 150 and a shoulder belt mount 160. A seat back foam 140 covers the seat back 110.

Figure 2:
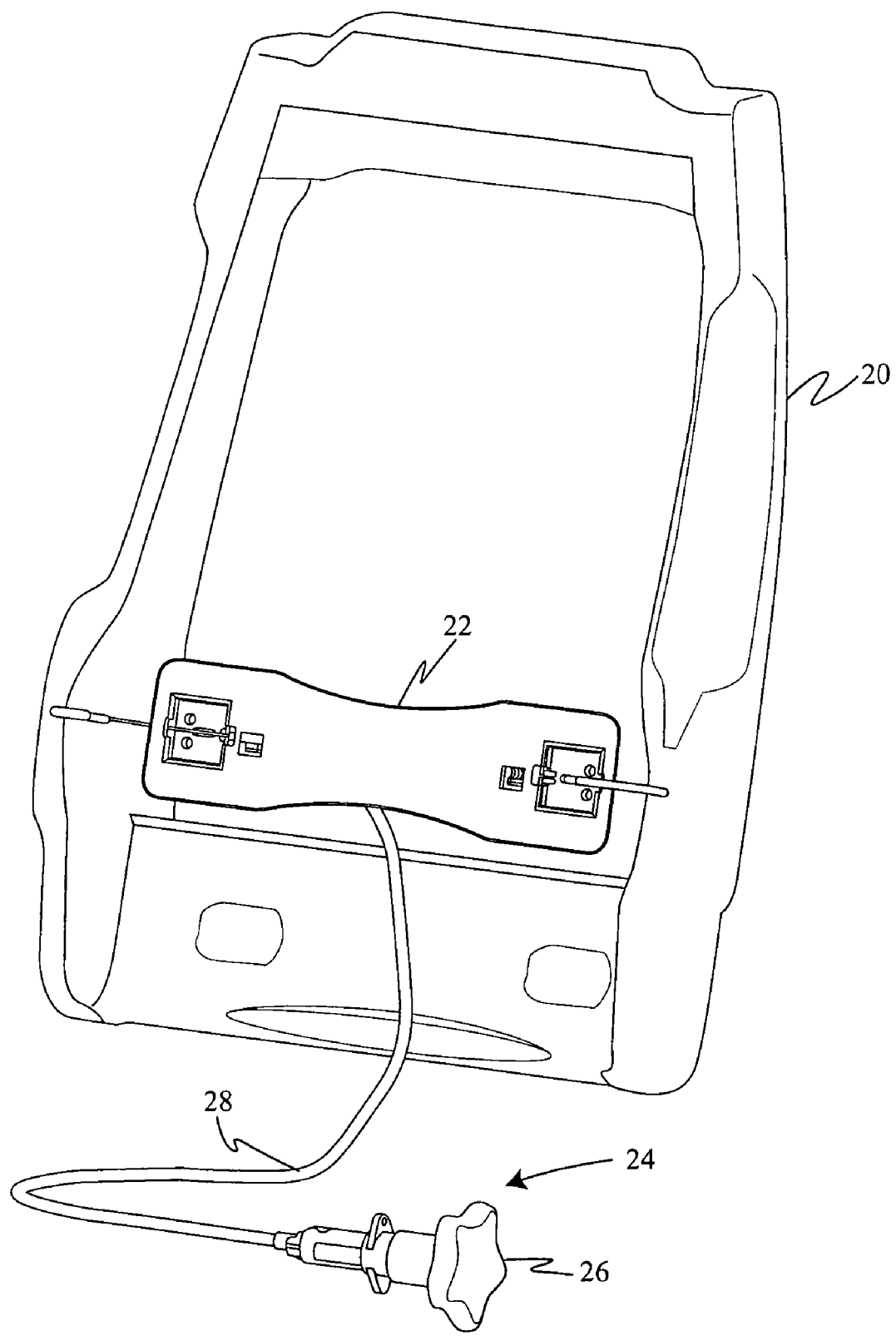
FIG. 2 is a perspective view of a seat back frame with a prior art lumbar support belt mounted thereon.

FIG. 2 illustrates a seat frame 20. As an example, the seat frame 20 may form a portion of the seat back 110. A belt-type lumbar support 22 is mounted in the seat frame 20 at lateral anchor points. The belt 22 is controlled by an actuator 24. In the embodiment shown, a user rotates a handle 26 to engage the actuator 24 which moves a cable 28 to increase or decrease the amount of support provided by the belt 22. In another embodiment the actuator 24 is a motor. The cables referred to herein are what are typically called 'Bowden' cables or traction cables, which comprise a wire that slides axially through a sleeve. One end of the wire has a slug or hook attached thereto for coupling to the device to be moved, in this case the lumbar support. The other end of the wire is attached to an actuator, typically either motorized or manually actuated, for pulling the wire through the sleeve.

Figure 3:
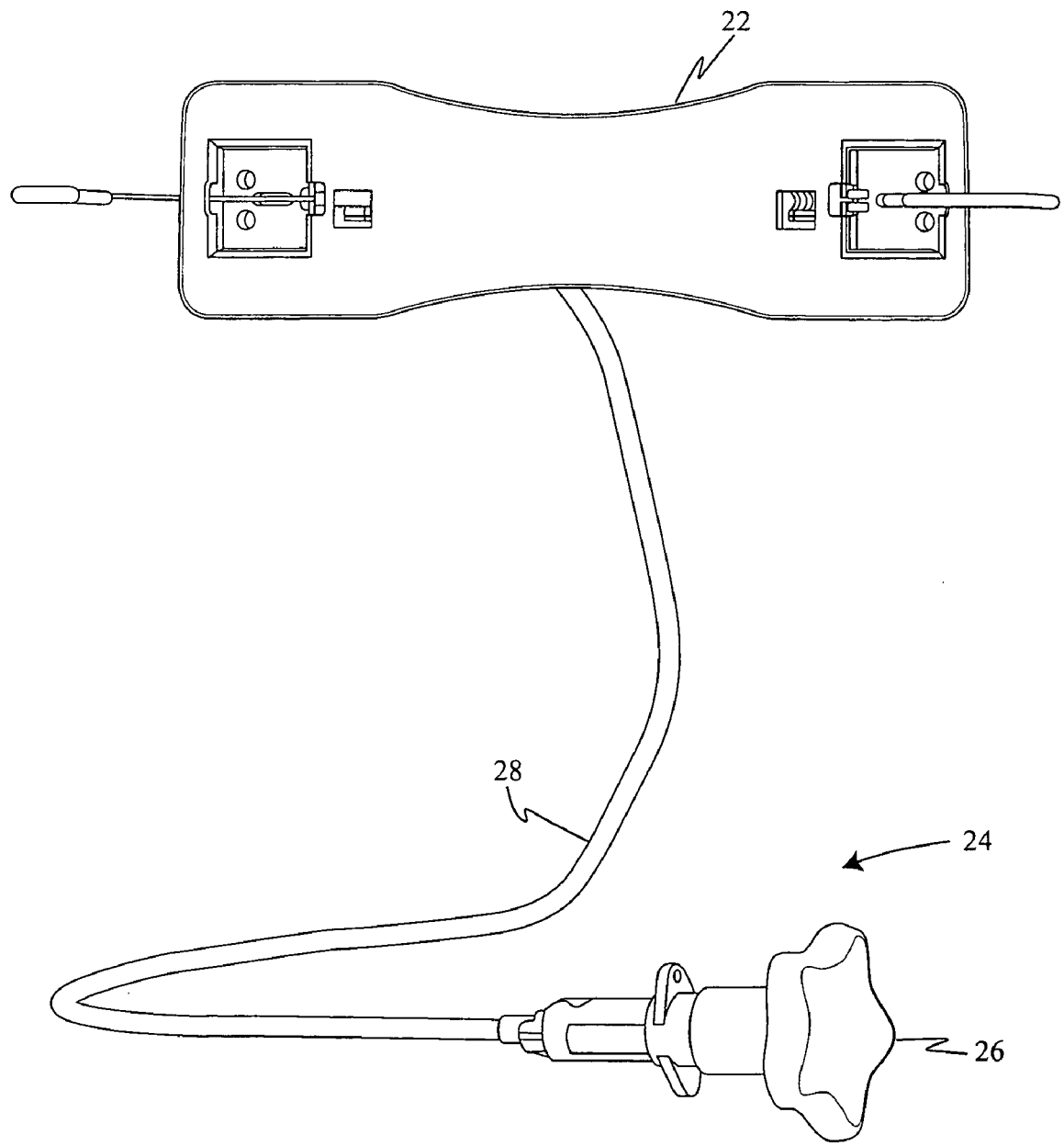
FIG. 3 is a perspective view of a prior art belt-type lumbar device as seen from the front.
Figure 4:
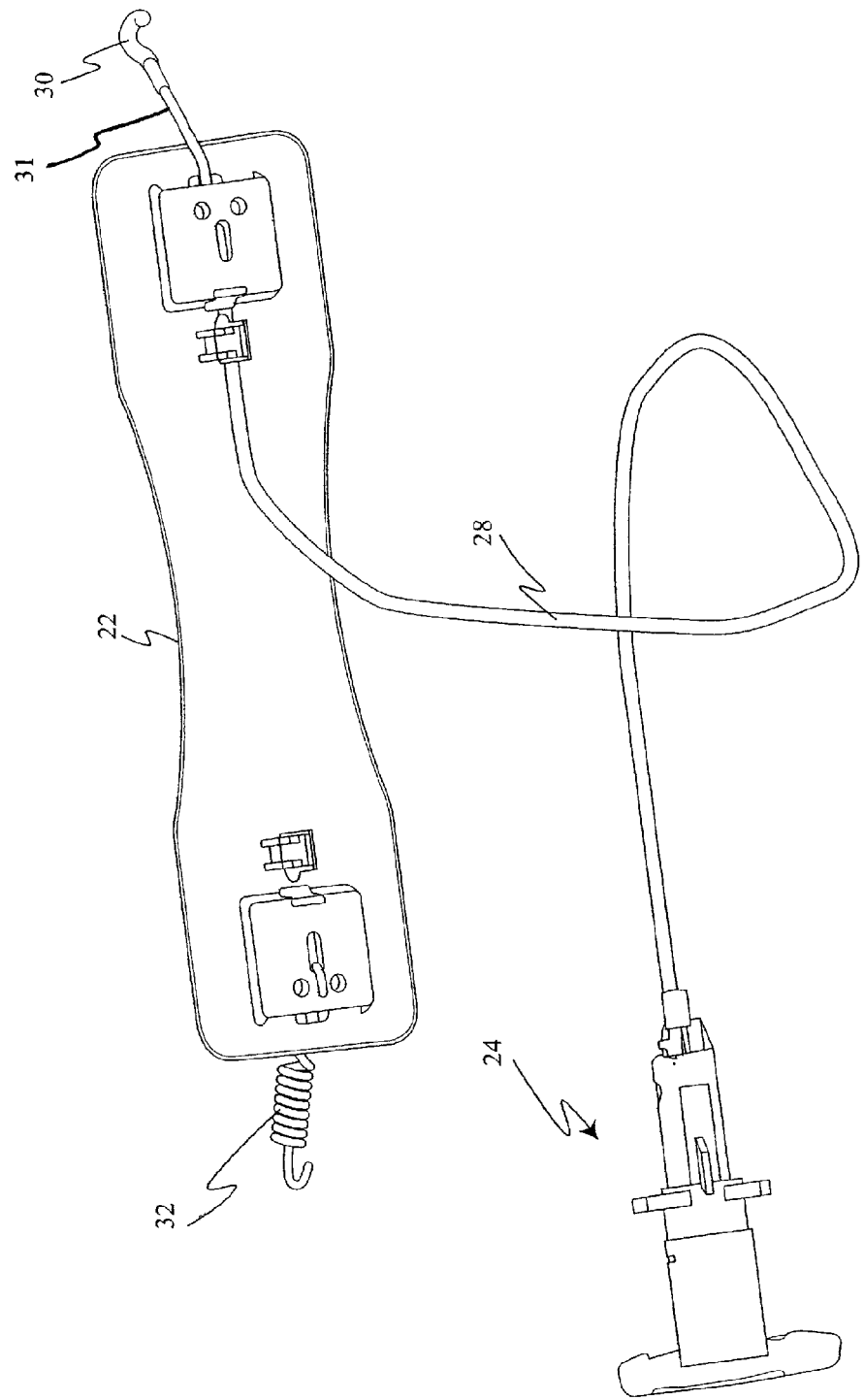
FIG. 4 is a rear view of the prior art lumbar support belt shown in FIG. 3.

FIG. 3 provides a detailed perspective view of a typical lumbar support belt 22. The lumbar support 22 includes at least one tensioning member, such as a spring 32 and cable end 30 (FIG. 4). The cable end 30 and the spring 32 connect to the seat frame 20. In some embodiments, the lumbar support 22 may have a spring on each end or a cable end on each end. In the embodiment depicted in FIG. 3, it is apparent that this economical design includes only a single point anchor contact on either side making undesirable twisting possible.

FIG. 4 illustrates a rear view of the lumbar support 22. In the depicted embodiment, the cable 28 extends from the actuator 24 to the belt 22. A cable end 30 is attached to the cable wire 31 of the cable 28. The handle 26 is rotated to apply a tractive force to the cable wire 31 to adjust a certain support provided by the belt 22.

Figure 5:
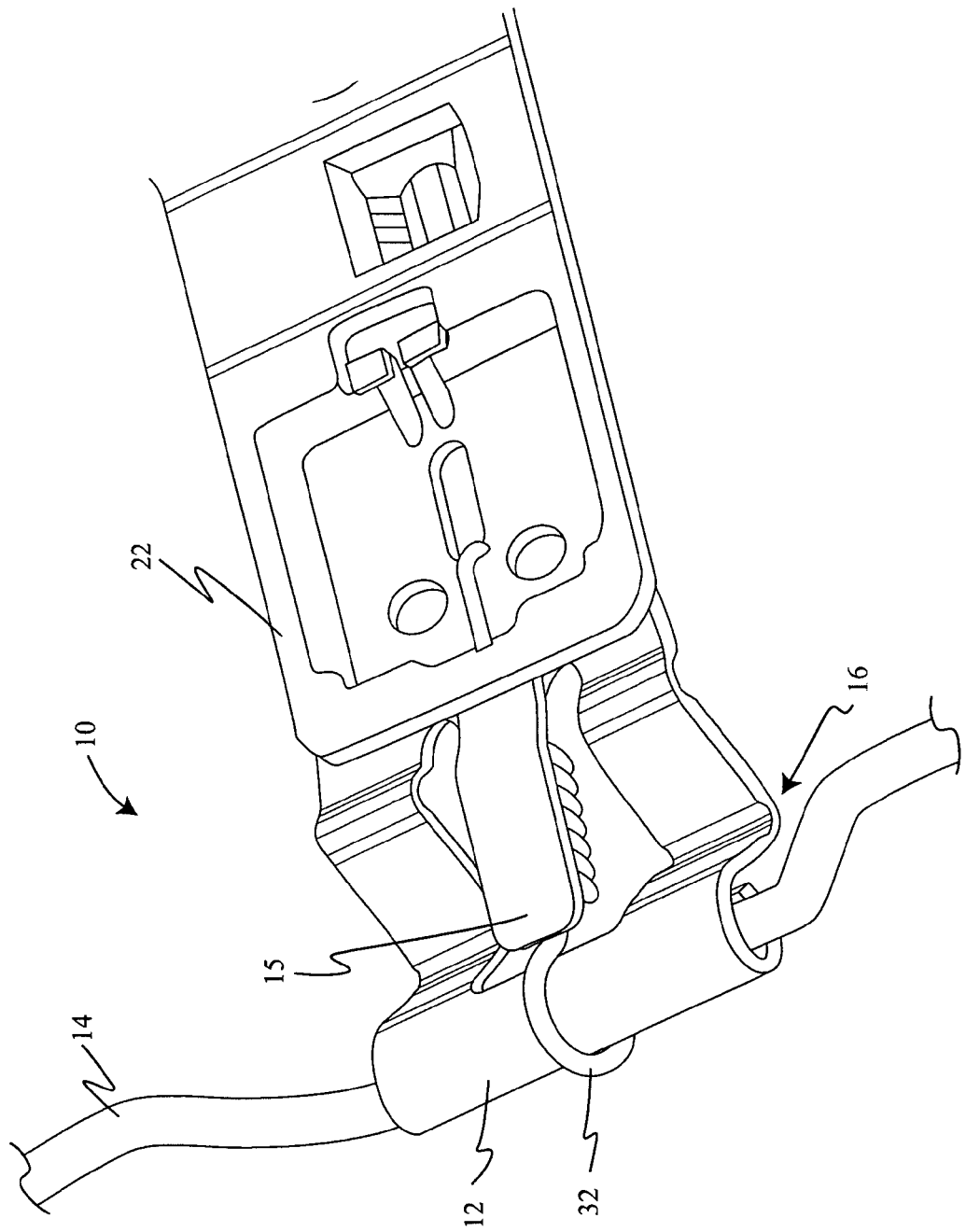
FIG. 5 is a perspective view of a belt extension.

FIG. 5 illustrates a first embodiment of a belt extension 10. In the embodiment depicted in FIG. 5, the belt extension 10 is integral with the belt 22. The belt 22 includes a flexible tab or hinge portion 16, an attachment tab 12 and rectangular opening acting as a receiver 18. The belt extension 10 extends over the wire spring 32. The belt extension 10 includes a belt extension tongue 15 that fits within the receiver 18. The belt extension tongue 15 can slide relative to the receiver 18. The hinge 16 allows the belt 22 to move toward or away from a seat occupant but significantly reduces the ability of the belt 22 to twist or rotate. The hinge portion 16 in the embodiment shown in FIG. 5 encompasses two opposing curves with a short straight section therebetween as well as a straight section disposed between one curve and the attachment tab 12. The depicted hinge 16 is integrally formed to be thinner at its top and bottom angles, as is typical for a living hinge of this sort, so that flexing occurs mainly at the thinned portions. Additional movement of the hinge region occurs due to rotation of the attachment tab 12 relative to the support wire 14. Support wire 14 is connected to the attachment tab 12. The support wire 14 is used to attach the belt 22 to the frame 20. The hinge portion 16 allows the end portion of the belt 22 to have some transverse movement. In the depicted embodiment, the hinge 16 is V-shaped or wing shaped.

Figure 6:
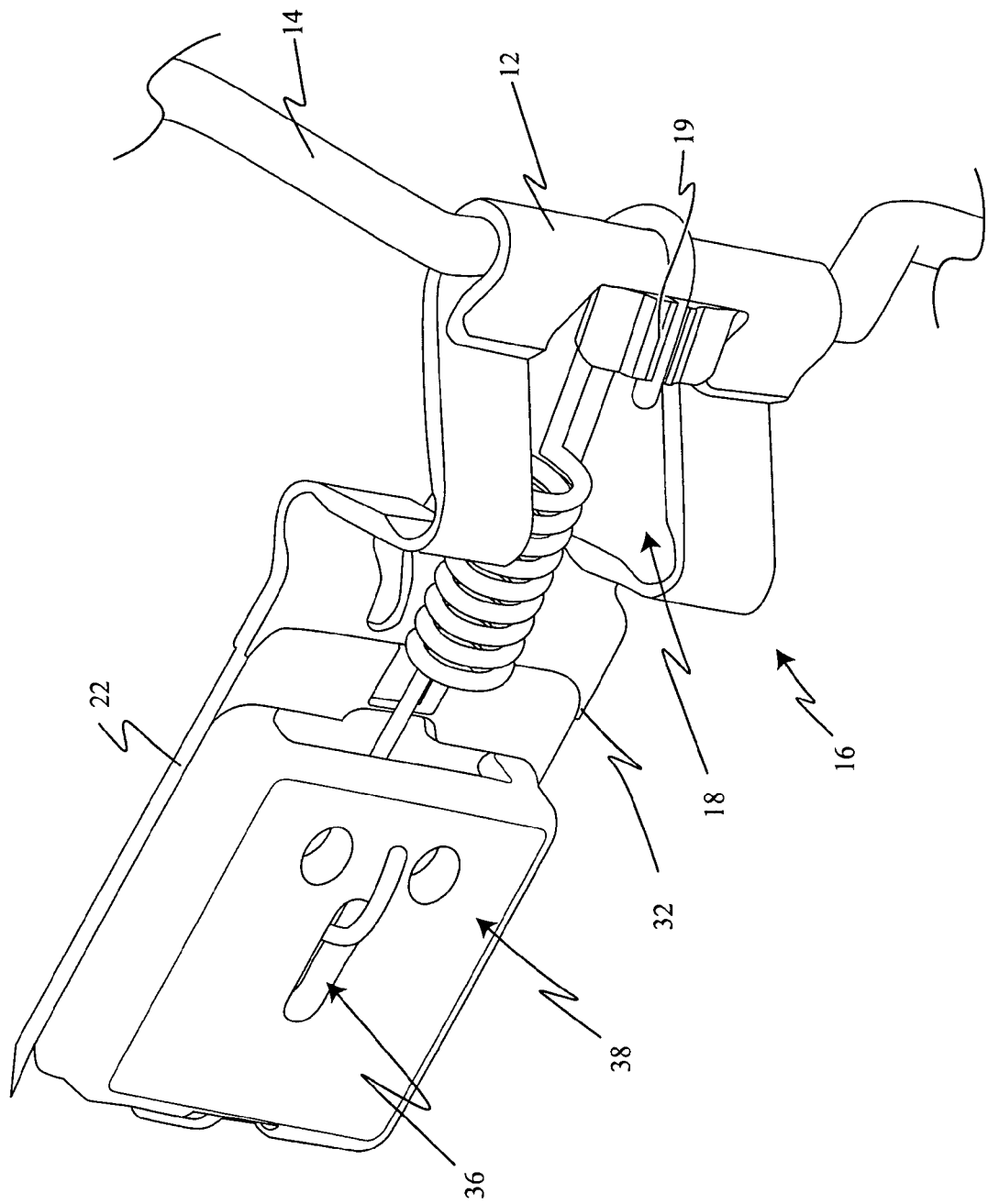
FIG. 6 is a rear view of the belt extension shown in FIG. 5.

FIG. 6 illustrates a rear view of the belt extension 10. The belt 22 includes the hinge portion 16 and the receiver portion 18. As can be seen in FIG. 6, the spring 32 operates or moves behind the belt extension 10. The belt 22 also includes a cup 38, which comprises a depression near the end of the belt 22. In the depicted embodiment, the cup 38 is a rectangular prism-shaped portion. The cup 38 includes a slot 36 to receive an end of the wire spring 32. Hook seat 19 has a length further resisting any twisting of the spring hook on the support wire 14.

Figure 7:
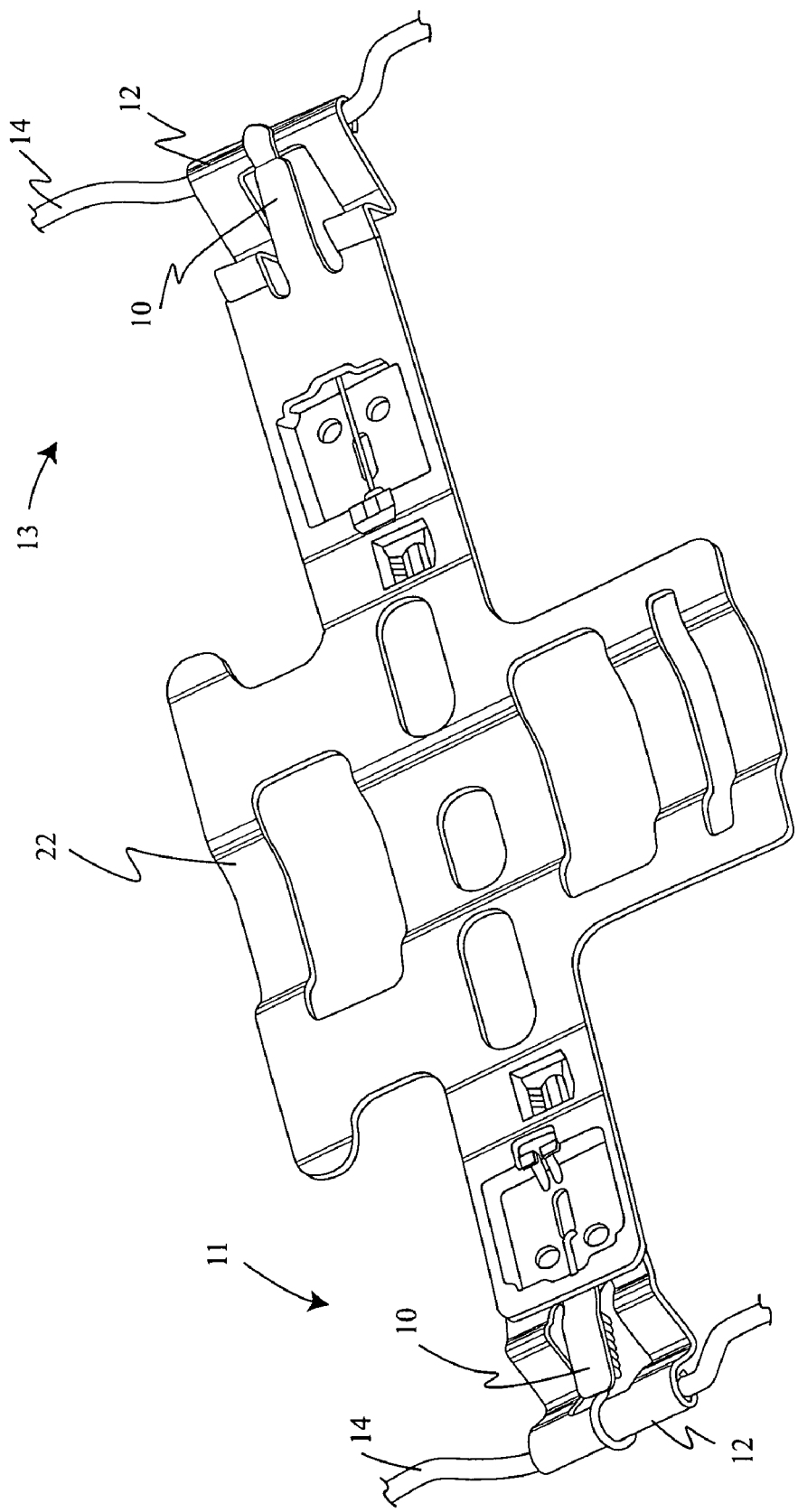
FIG. 7 is a perspective view of a belt lumbar support having a belt extension.

FIG. 7 illustrates a perspective view of the belt 22. The belt 22 includes the belt extension 10 on each end. One end covers the wire spring 32 and the other end covers the end of the cable 28. The belt 22 has a first end portion 11 and a second end portion 13. An attachment tab 12 is located on each end portion 11, 13. In the depicted embodiment, the belt 22 includes vertical extensions for additional lumbar support.

Figure 8:
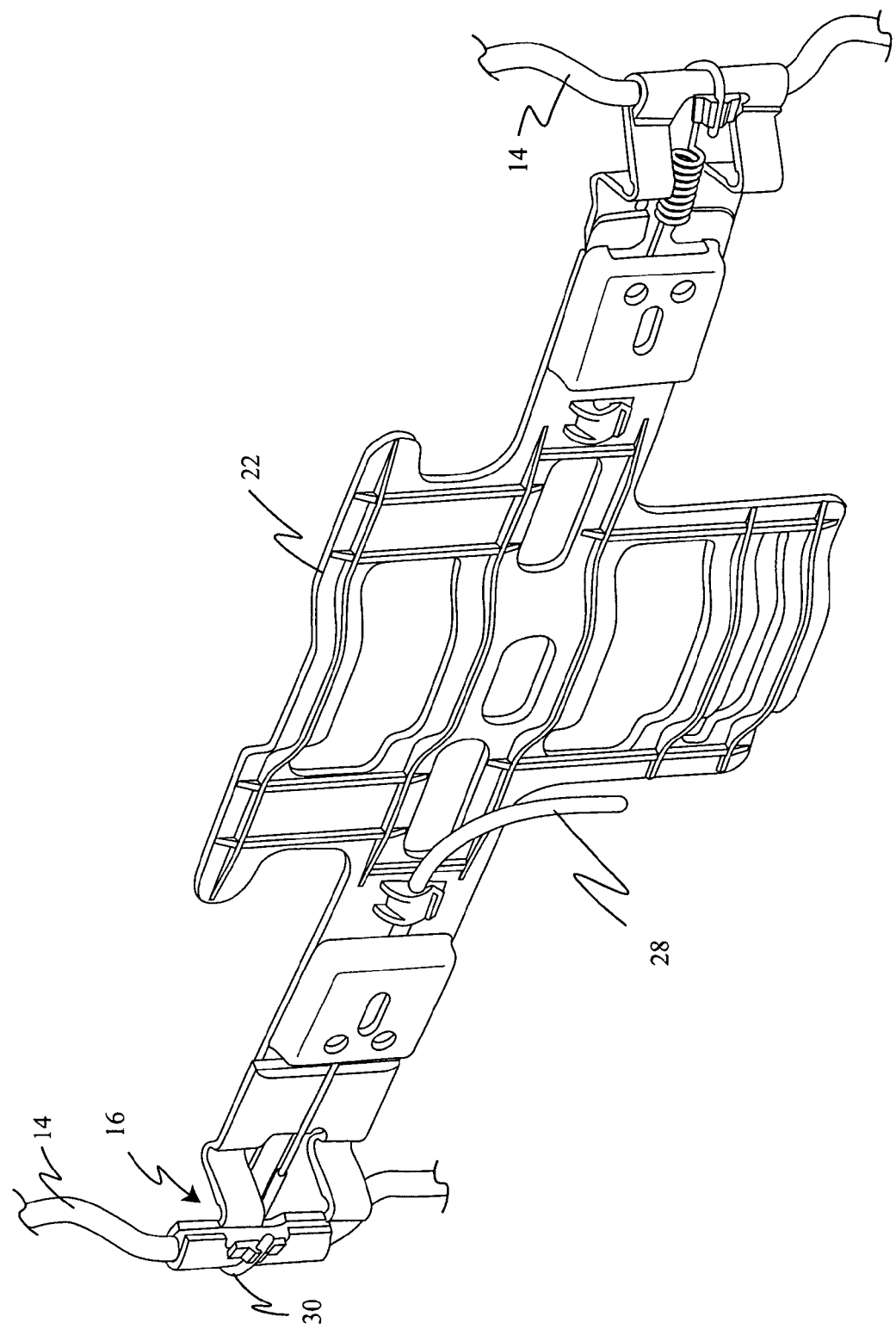
FIG. 8 is a rear view of the belt shown in FIG. 7.

FIG. 8 illustrates a rear view of the belt 22. As can be seen in the depicted embodiment, the cable 28 connects to the belt 22 and the cable end 30 connects to the attachment tab 12.

Figure 9:
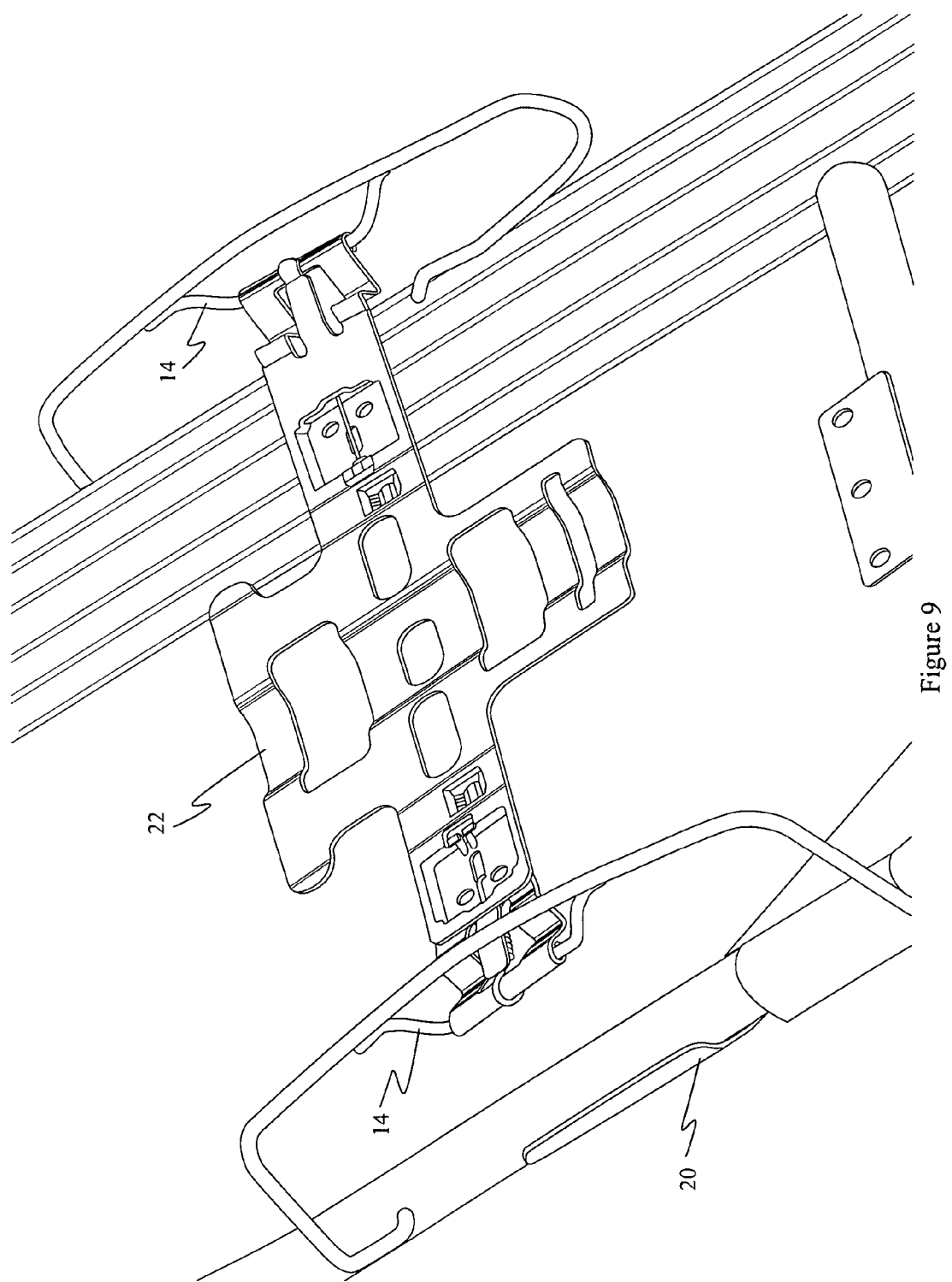
FIG. 9 is a perspective view of the belt of FIG. 7 mounted in a seat frame.

FIG. 9 illustrates a perspective view of the seat frame 20. As can be seen in the depicted embodiment, the support wires 14 are used to connect the belt 22 to the frame 20. The support wires 14 may be connected by welding or through the use of fasteners.

Figure 10:
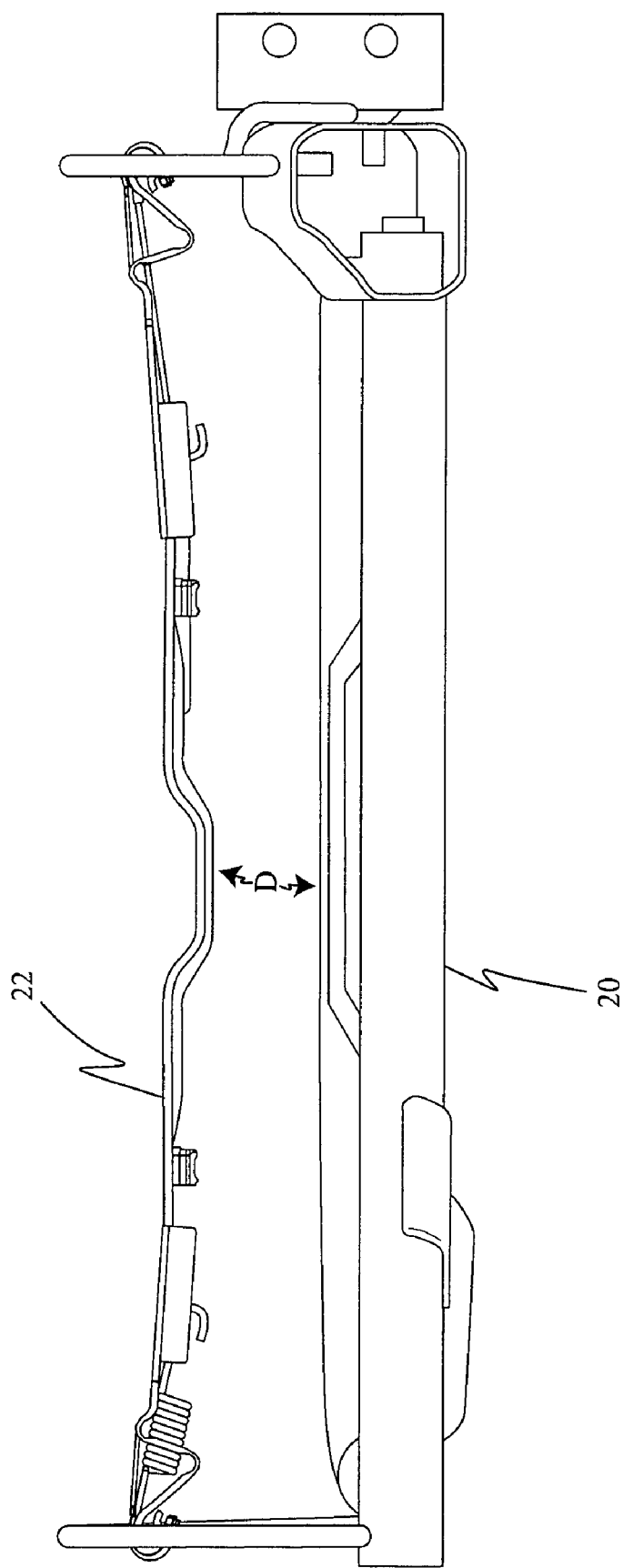
FIG. 10 is a bottom view of a seat frame.

FIG. 10 illustrates a bottom view of the frame 20 and the belt 22. Also shown is dimension D. As a tractive force is applied to the cable 28, D increases. As the tractive force is released, D decreases. As D increases, support belt 22 provides a greater amount of lumbar support.

Figure 11:
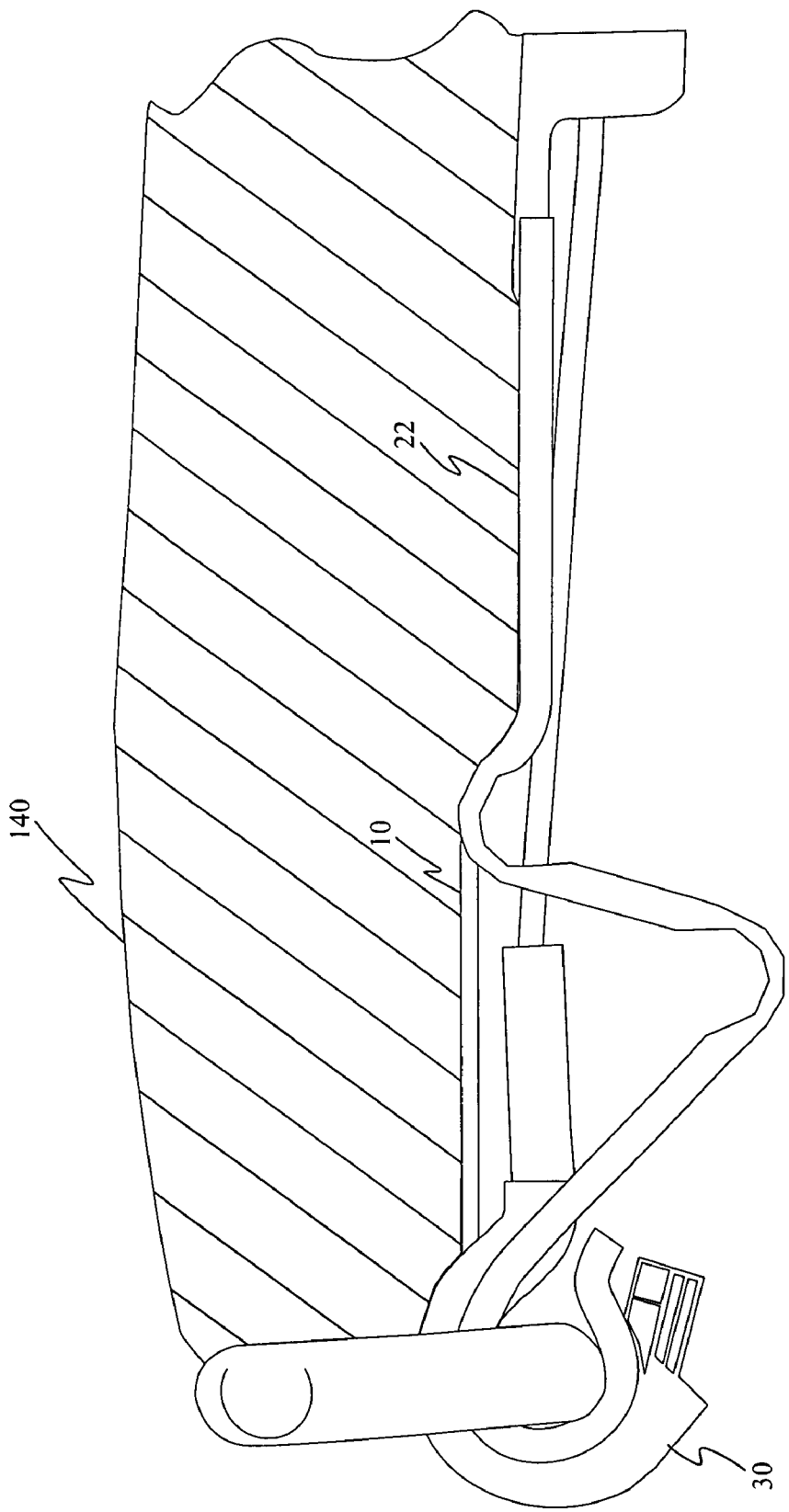
FIG. 11 is a detailed bottom view of the belt support.

FIG. 11 illustrates a detailed bottom view of the belt extension 10. In the depicted embodiment, the seat back foam 140 is also shown in cross-section. As can be seen in the embodiment depicted in FIG. 11, the belt extension 10 prevents the cable end 30 from wearing on the back foam 140.

Figure 12:
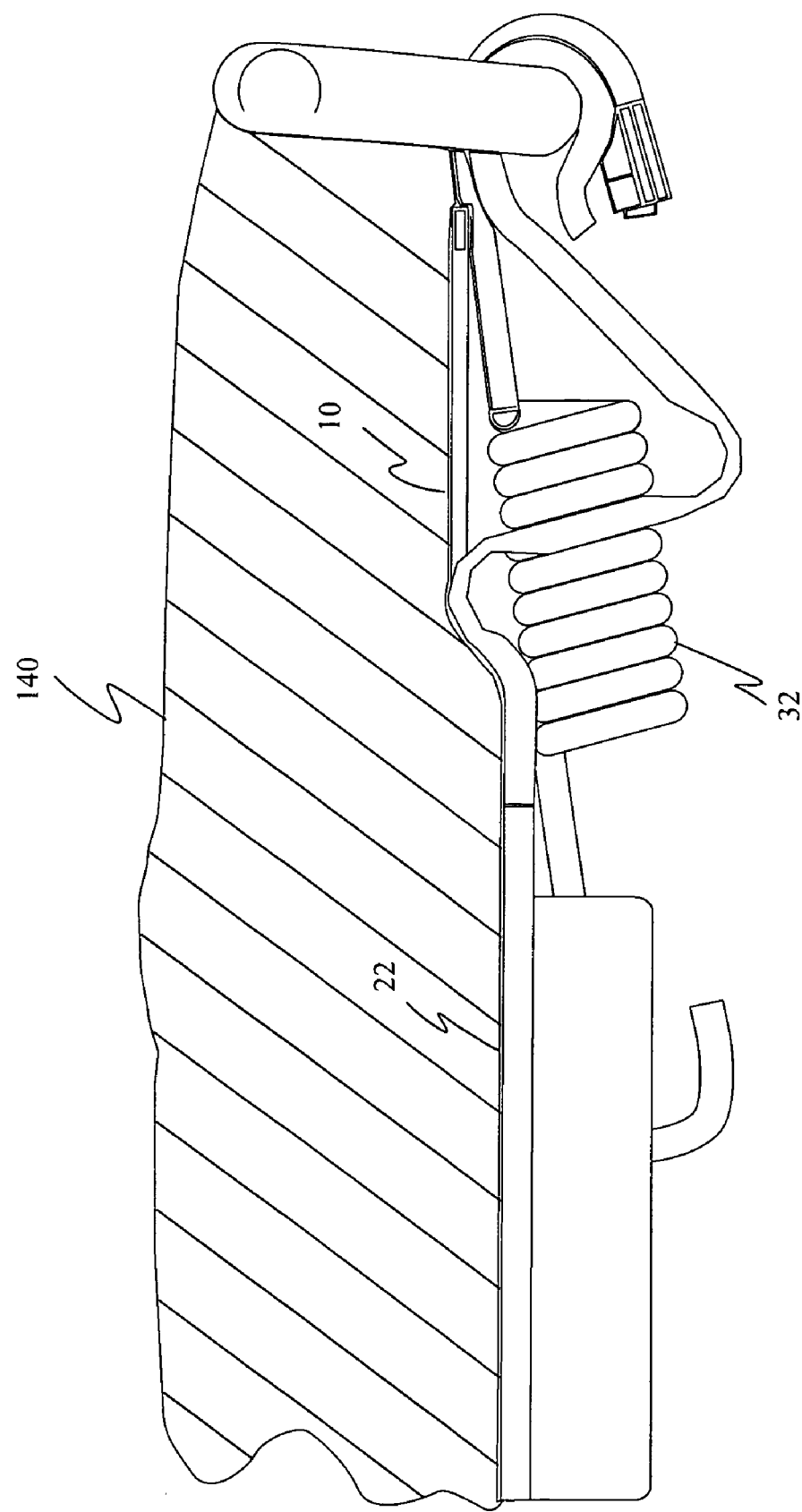
FIG. 12 is a detailed bottom view of the lumbar support.

FIG. 12 illustrates a bottom detailed view of the belt extension 10. As can be seen in FIG. 12, the belt extension 10 prevents the spring 32 from wearing upon the seat back foam 140.

Figure 13:
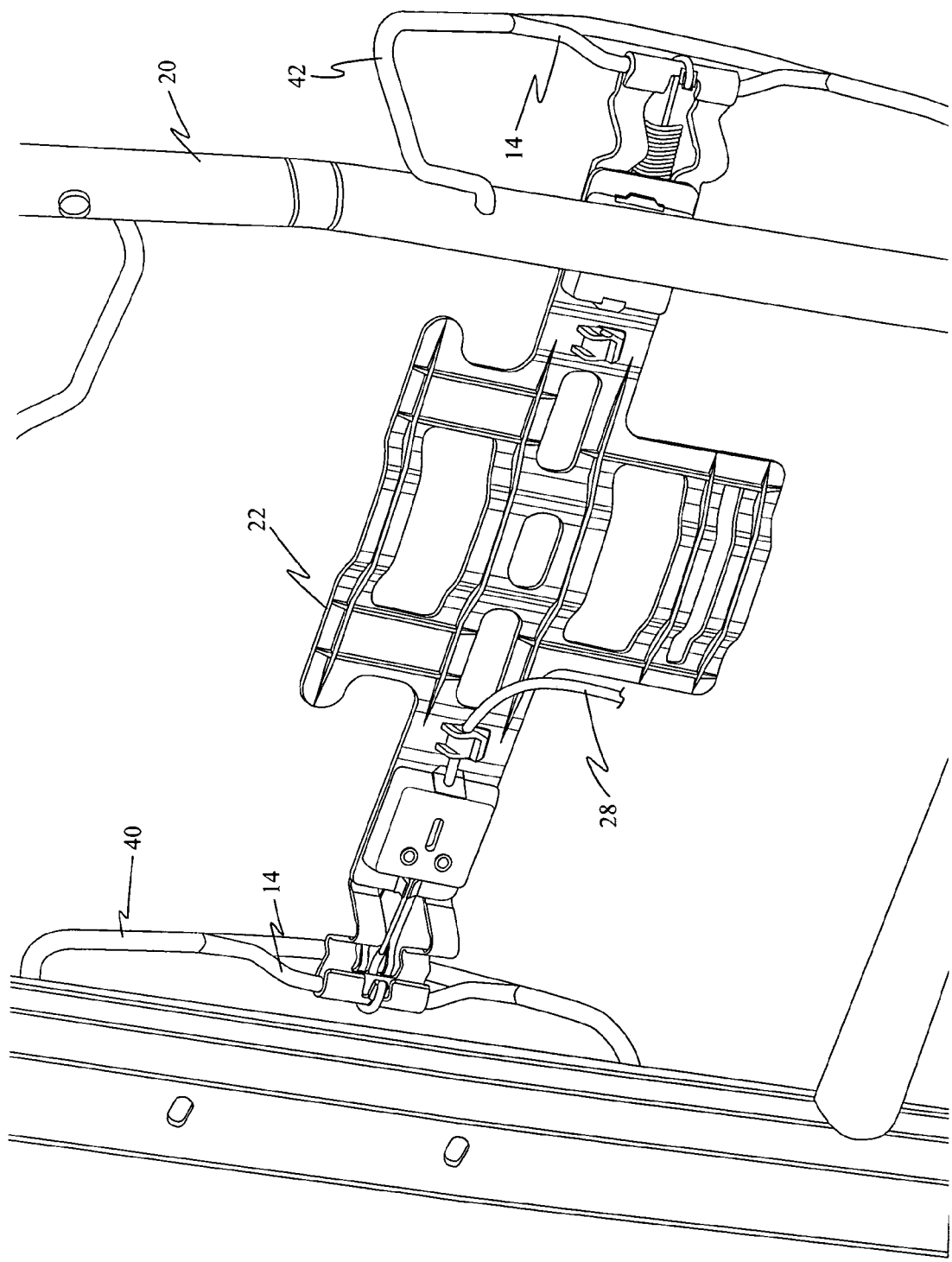
FIG. 13 is a rear perspective view of the belt installed on a seat frame.

FIG. 13 illustrates a rear perspective view of the seat frame 20 with the belt 22. In the depicted embodiment, the frame 20 includes a first mounting member 40 and a second mounting member 42. The wire supports 14 are connected to the first and second mounting members 40, 42.

Figure 14:
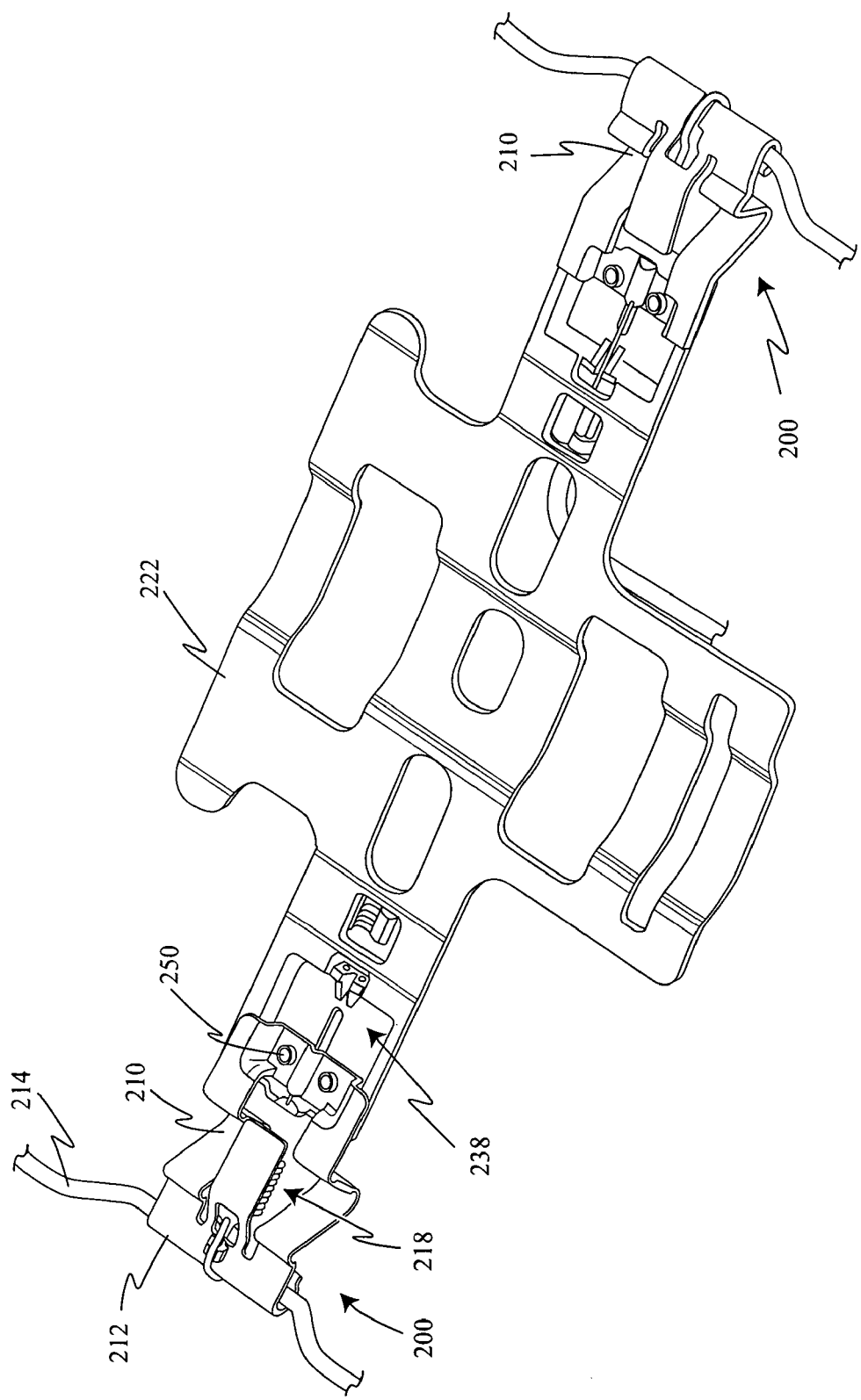
FIG. 14 illustrates a second embodiment of the belt extension.

FIG. 14 illustrates a second embodiment of the belt extension. In this embodiment, the belt extension 200 is a separate component that is attached to a belt 222. The belt extension member 200 includes a belt extension tongue 210, a belt extension receiver 218, an attachment tab 212, and a wire support 214. In the depicted embodiment, the belt extension 200 is connected to the belt 222 at a cup 238 formed in a lateral portion of the belt 222. In the depicted embodiment, the cup 238 is rectangular and the belt extension 200 includes a portion adapted to fit within the cup 238. Fasteners 250 are used to connect the belt extension 200 to the belt 222 by attaching to complementary holes in the cup 238. In one embodiment the fasteners 250 are integrally formed in the cup-adapting portion of the belt extension 200.

Figure 15:
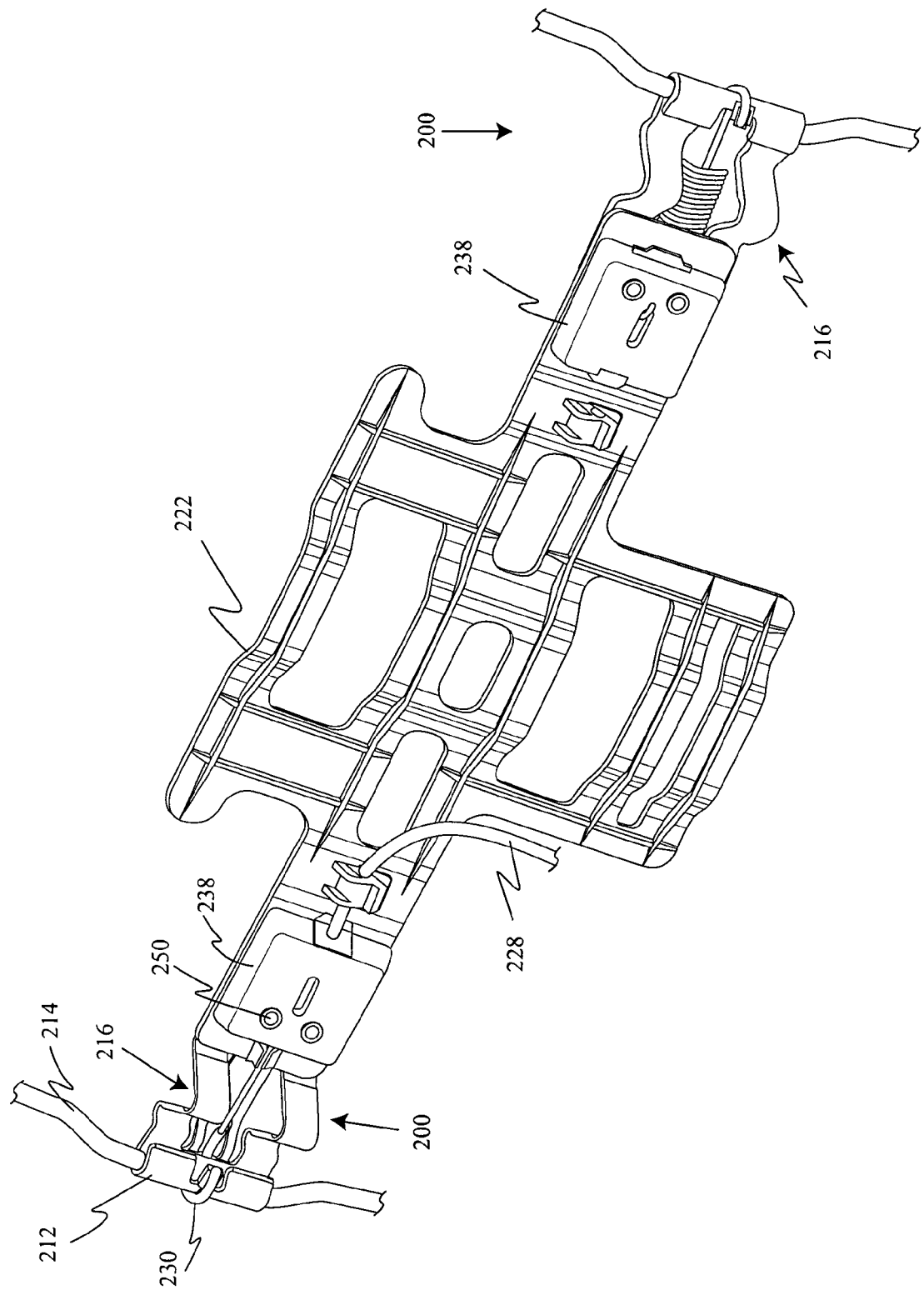
FIG. 15 is a rear view of the belt shown on FIG. 14.

FIG. 15 illustrates a rear view of the belt 222. The cable 228 is clipped onto the belt 222 and a cable end 230 extending from the cable 228 slides over the attachment tab 212. The belt extension 200 also includes a hinge portion 216 which provides the belt extension 200 with some transverse flexure but reduces the ability of the belt 222 to rotate, twist, or flex vertically. In the embodiment depicted in FIG. 15, the hinge is V-shaped or wing shaped. The hinge portion 216 in the embodiment shown in FIGS. 15-17 comprises two straight portions that are coupled to one another and to the remainder of the belt extension by three thinned, curved regions where most of the flexing occurs.

Figure 16:
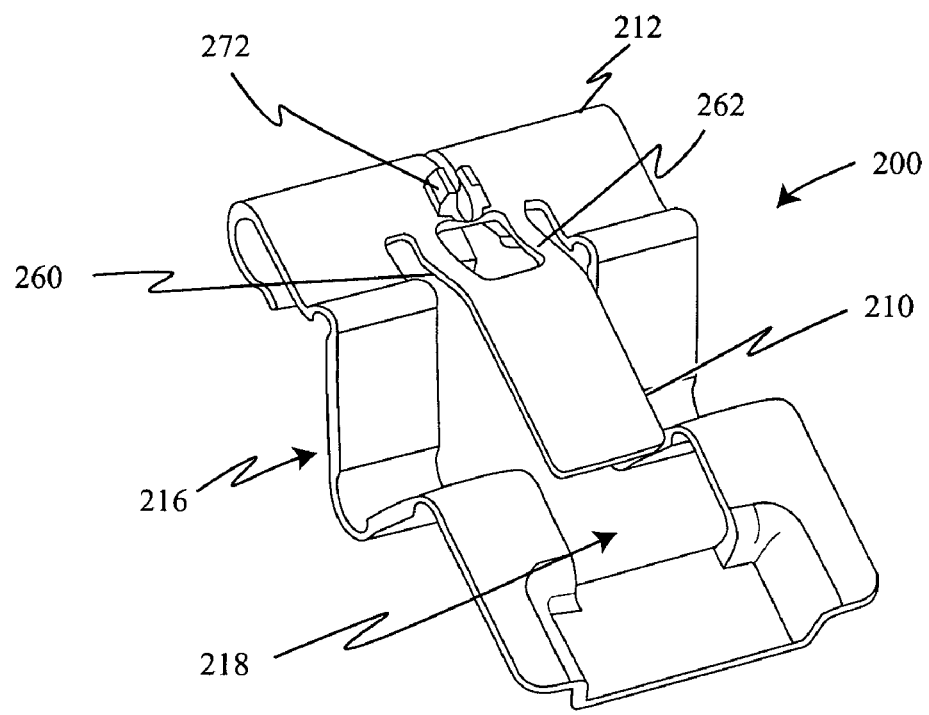
FIG. 16 is a front perspective view of belt extension member.

FIG. 16 illustrates a detailed perspective view of the belt extension 200 by itself. The belt extension 200 includes the belt tongue 210, the hinge 216, the receiver 218, and the attachment tab 212. The belt tongue 210 includes a first leg 260 and a second leg 262. The legs 260, 262 extend from the attachment tab 212 and hold the tongue 210 onto the attachment tab 212. The belt extension 200 also includes a first clip receiver 270 and second clip receiver 272. The tandem spacing of the clip receivers 270, 272 further reduces twisting. In the depicted embodiment, the V-shaped hinge 216 is integrally formed with the belt extension 200.

Figure 17:
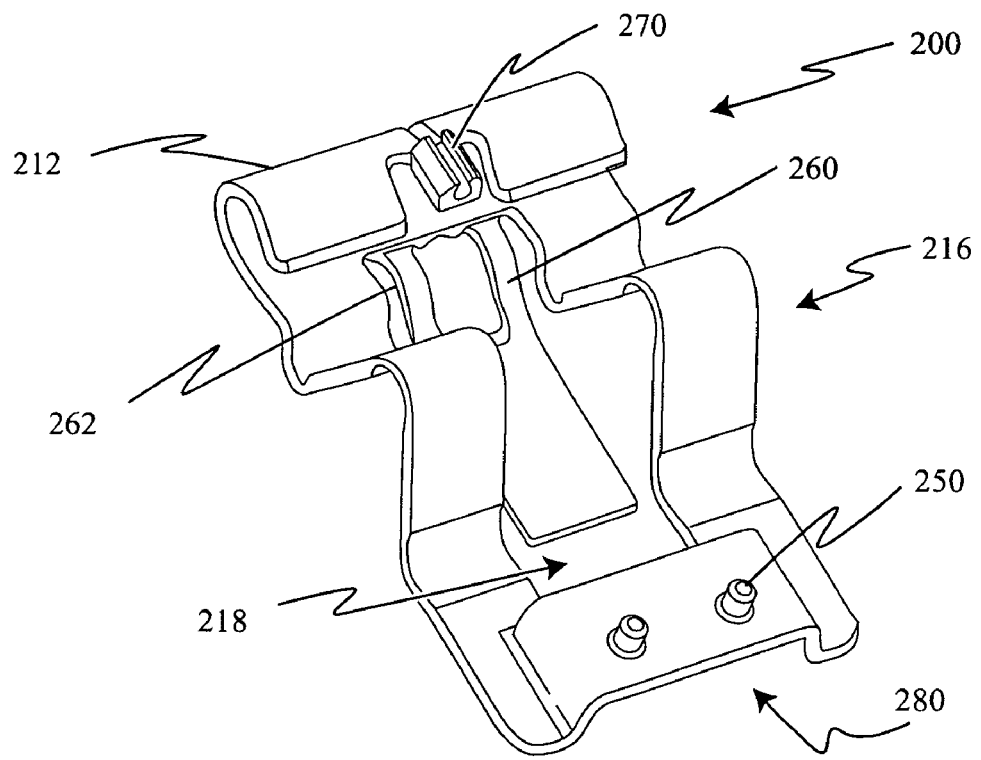
FIG. 17 is a rear view of the belt extension member shown in FIG. 16.

In the embodiment depicted in FIG. 17, the belt extension 200 includes a protrusion 280. The protrusion 280 is adapted to fit within the cup 238. Further, in the depicted embodiment of FIG. 17, the protrusion includes integral fasteners 250. The fasteners 250 are plastic integral cylinders which are adapted to be melted in order to secure the belt extension 200 to the belt 222.

Figure 18:
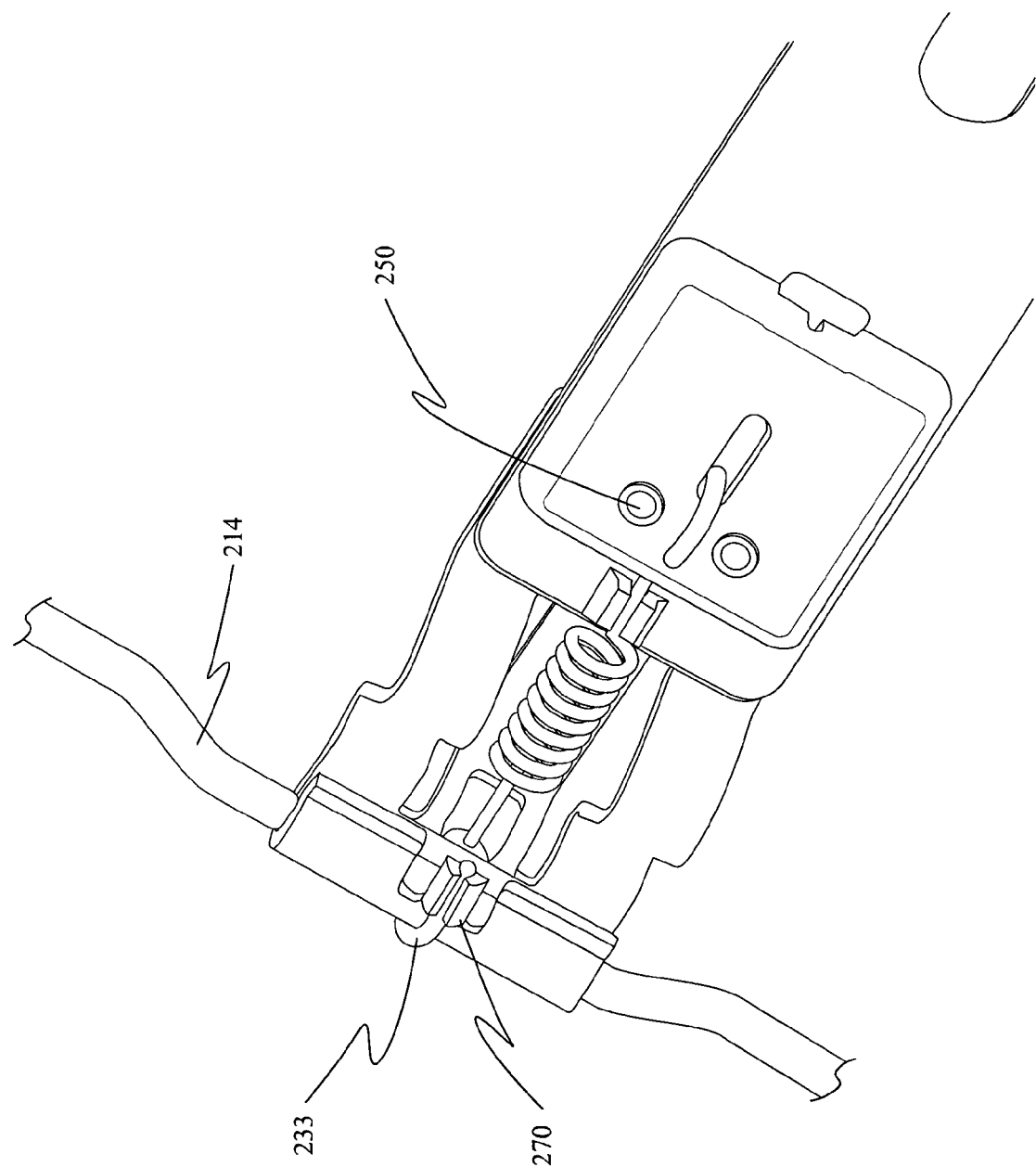
FIG. 18 is a detailed perspective rear view of the belt extension member.

FIG. 18 illustrates a rear perspective view of a belt 222 and the belt extension 200 of the second embodiment. The belt extension 200 includes the first clip receiver 270. An end of the spring 233 fits within the clip receiver 270. Also as shown in FIG. 18, fasteners 250 are used to connect the belt extension 200 to the belt 222. These fasteners may be rivets, screws, heat stakes or other types of fasteners.

Figure 19:
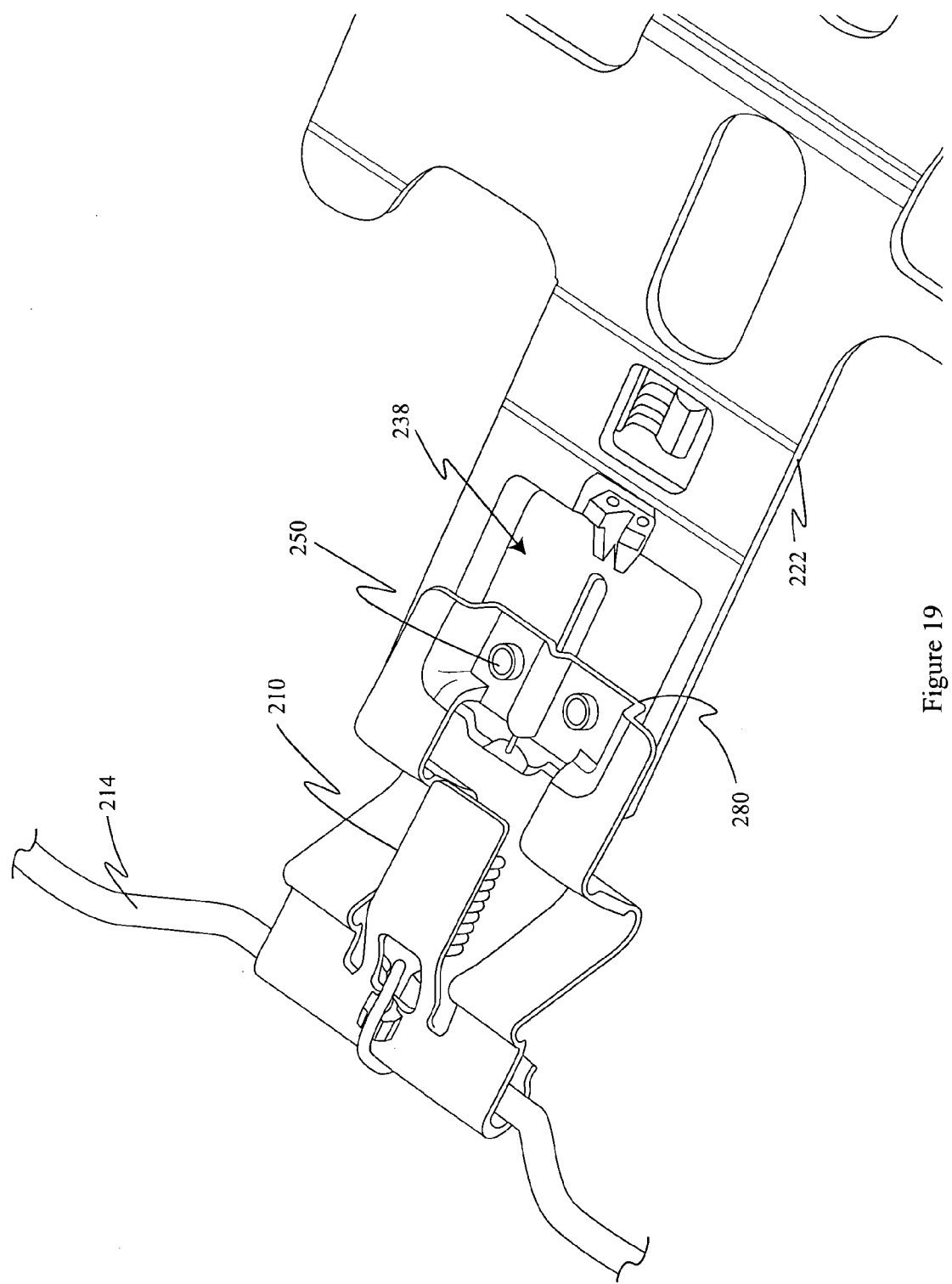
FIG. 19 is a front view of the belt extension member shown in FIG. 18.

FIG. 19 illustrates a front perspective view of the belt 222 and the belt extension 200. As can be seen in FIG. 19, the protrusion 280 is dimensioned to fit within the rectangular cup 238.

Figure 20:
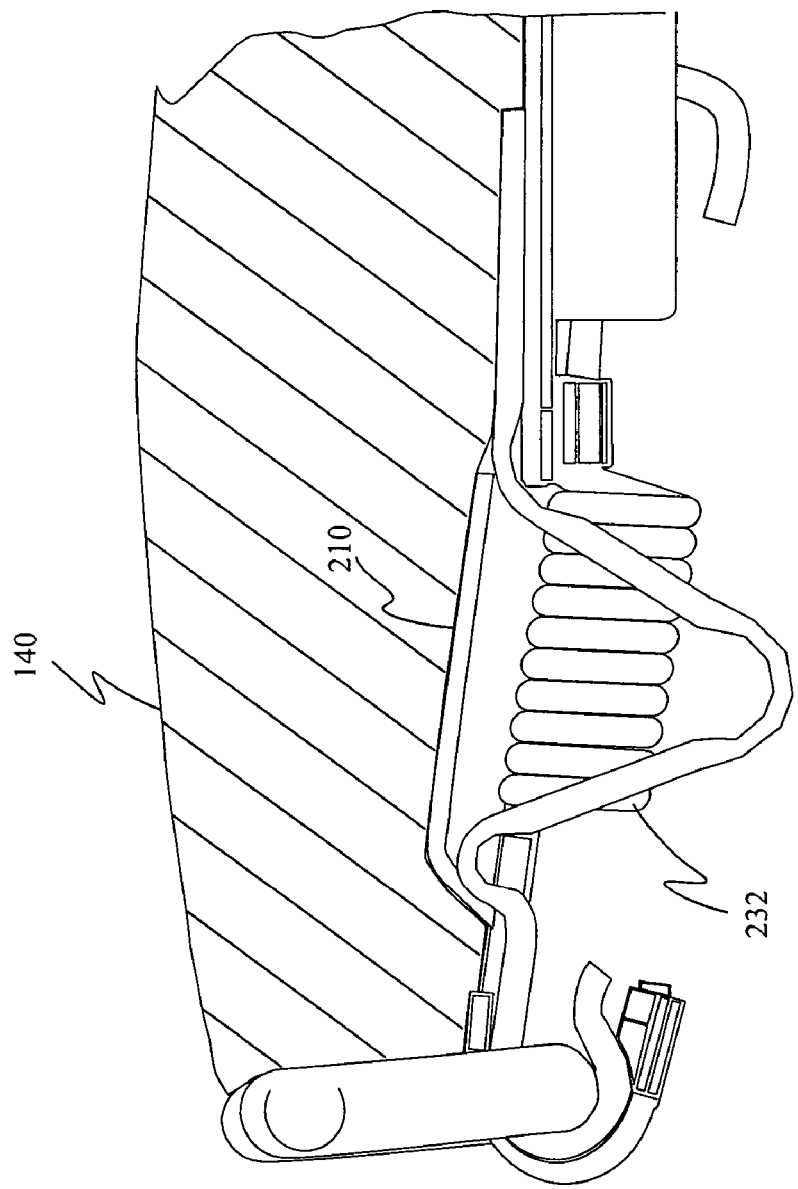
FIG. 20 is a detailed bottom view of the belt extension member.

FIG. 20 illustrates a detailed bottom view of the extension 200. As can be seen in FIG. 20, the belt tongue 210 is in between the spring 232 and the back foam 140. Thereby, the belt tongue 210 prevents the wire spring 232 from engaging the back foam 140.

Figure 21:
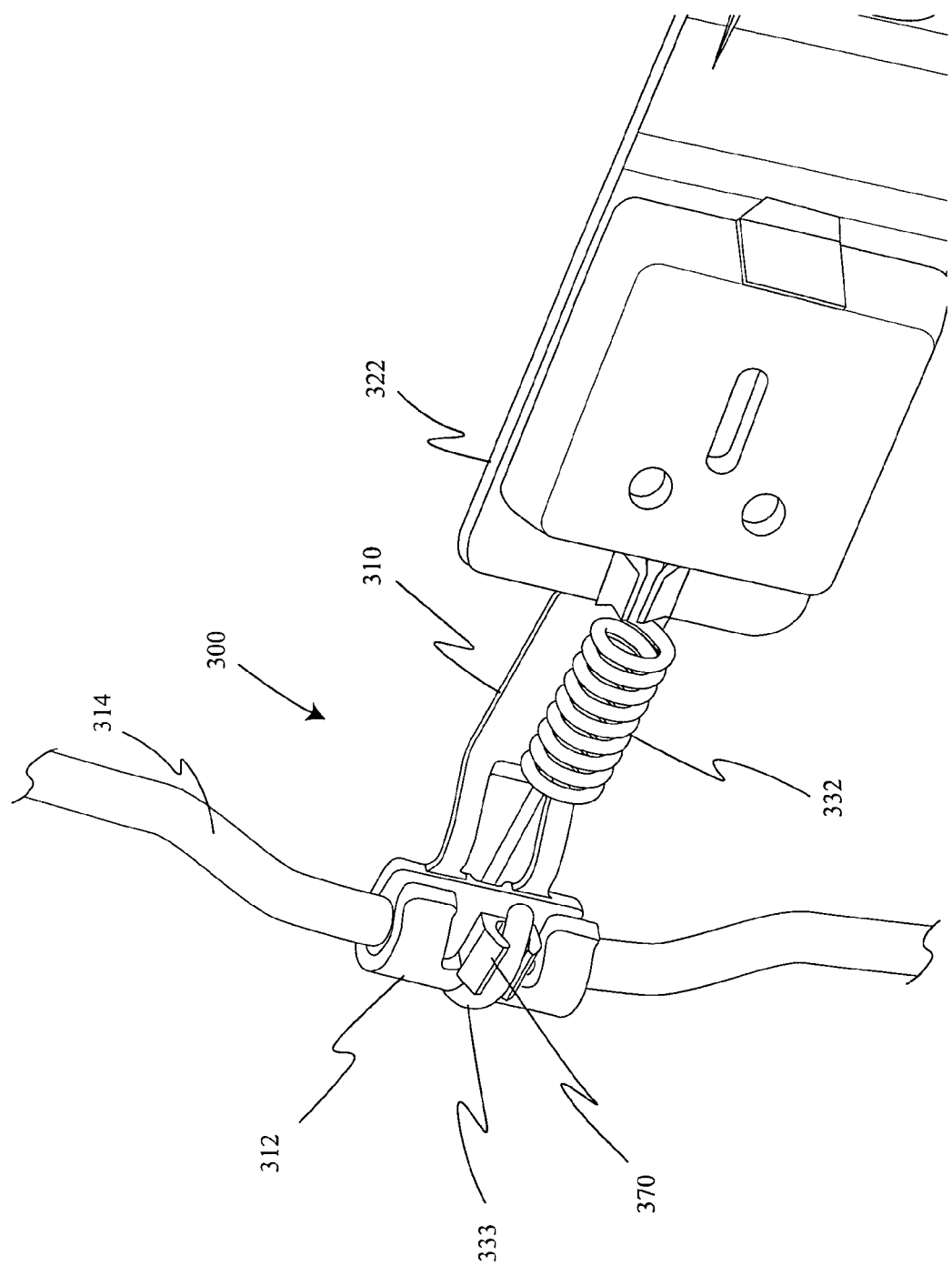
FIG. 21 is a rear perspective view of a belt extension member in a third embodiment.

FIG. 21 illustrates a third embodiment of a belt extension 300. The belt extension 300 includes a belt tongue 310, an attachment tab 312, a wire support 314, a wire spring 332, and an end of the spring 333. The belt extension 300 is not connected to a belt 322. The belt extension 300 includes a first clip receiver 370 which is adapted to receive the end 333 of the spring 332.

Figure 22:
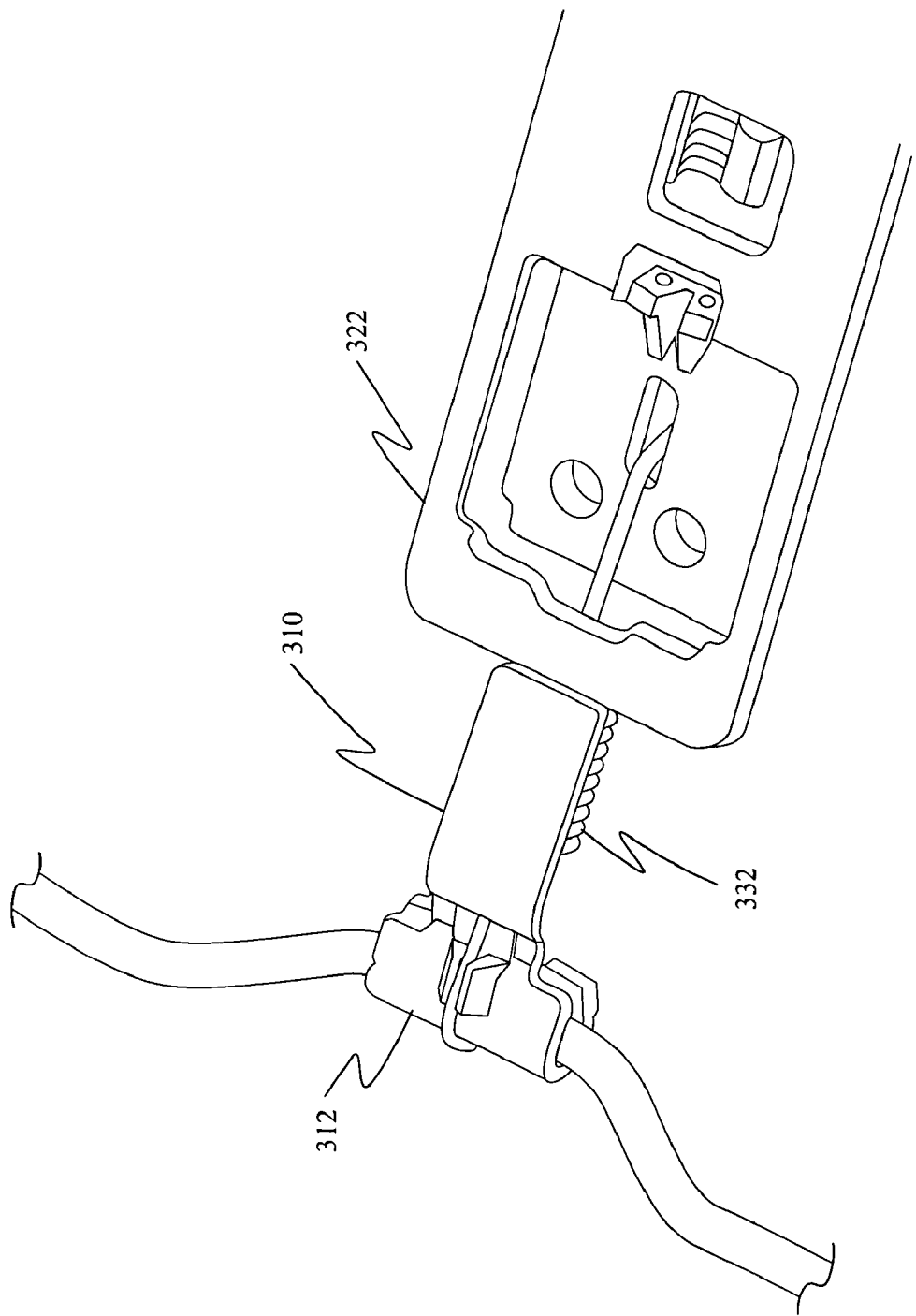
FIG. 22 is a front perspective view of the belt extension member shown in FIG. 21.

FIG. 22 illustrates a top perspective view of the belt extension 300. As can be seen in FIG. 22, the belt tongue 310 extends over the spring 332.

Figure 23:
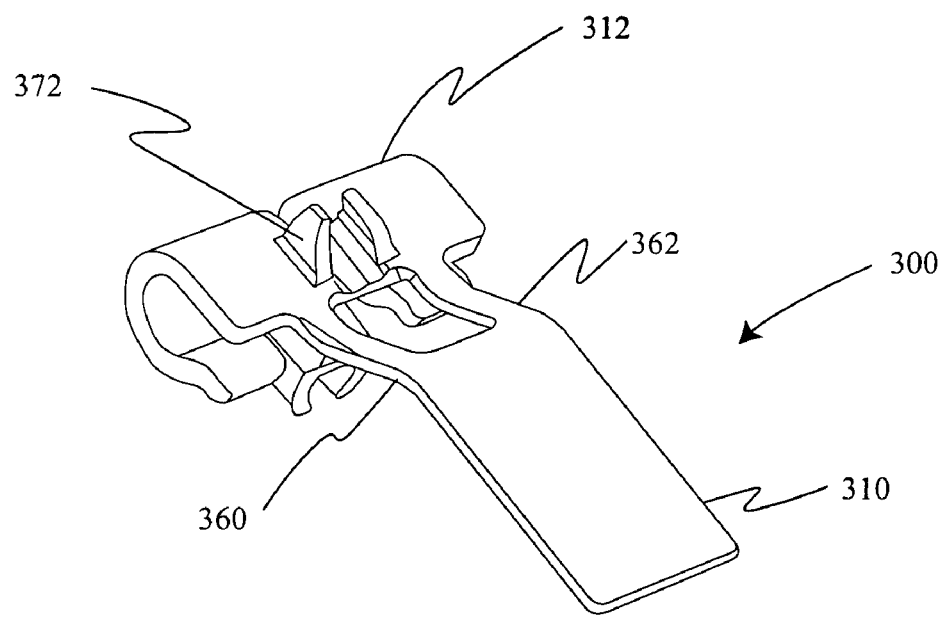
FIG. 23 is a front perspective view of the belt extension member in a third embodiment.
Figure 24:
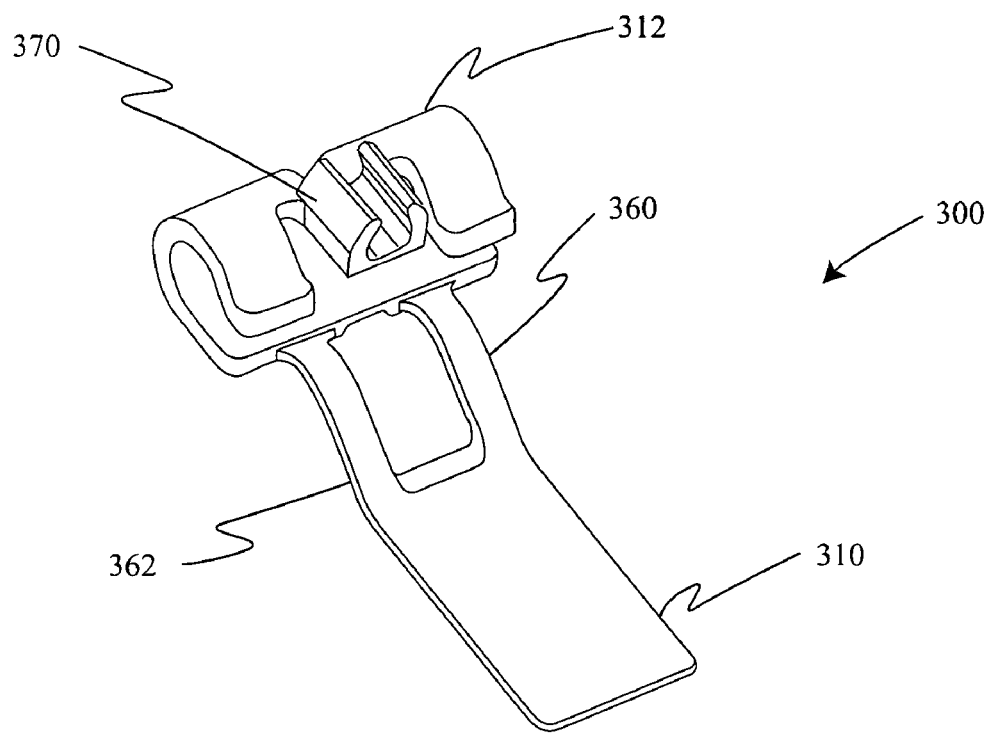
FIG. 24 is a rear view of the belt extension member shown in FIG. 23.

FIGS. 23 and 24 illustrate the belt extension in the third embodiment. The belt extension 300 includes the belt tongue 310, the attachment tab 312, a first leg 360 and a second leg 362. The legs 360, 362 extend from the attachment tab 312. The belt extension 300 further includes a first clip receiver 370 and second clip receiver 372.

Figure 25:
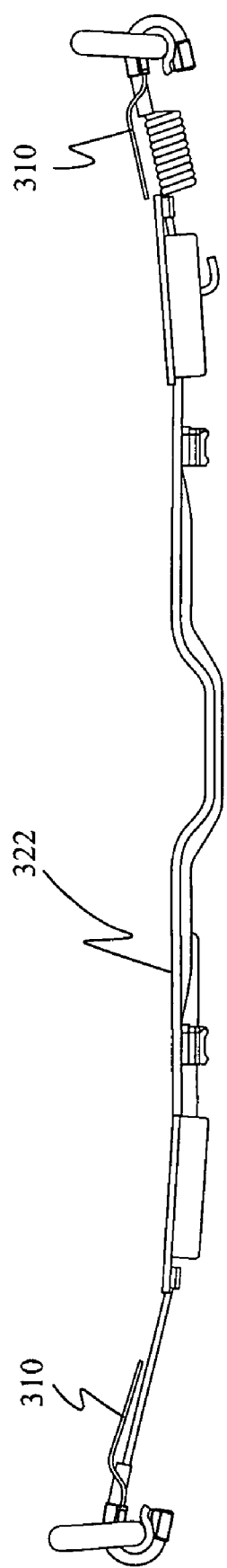
FIG. 25 is a bottom view of a lumbar support belt.

FIG. 25 illustrates a bottom view of the belt 322 and the belt tongue 310.

Figure 26:
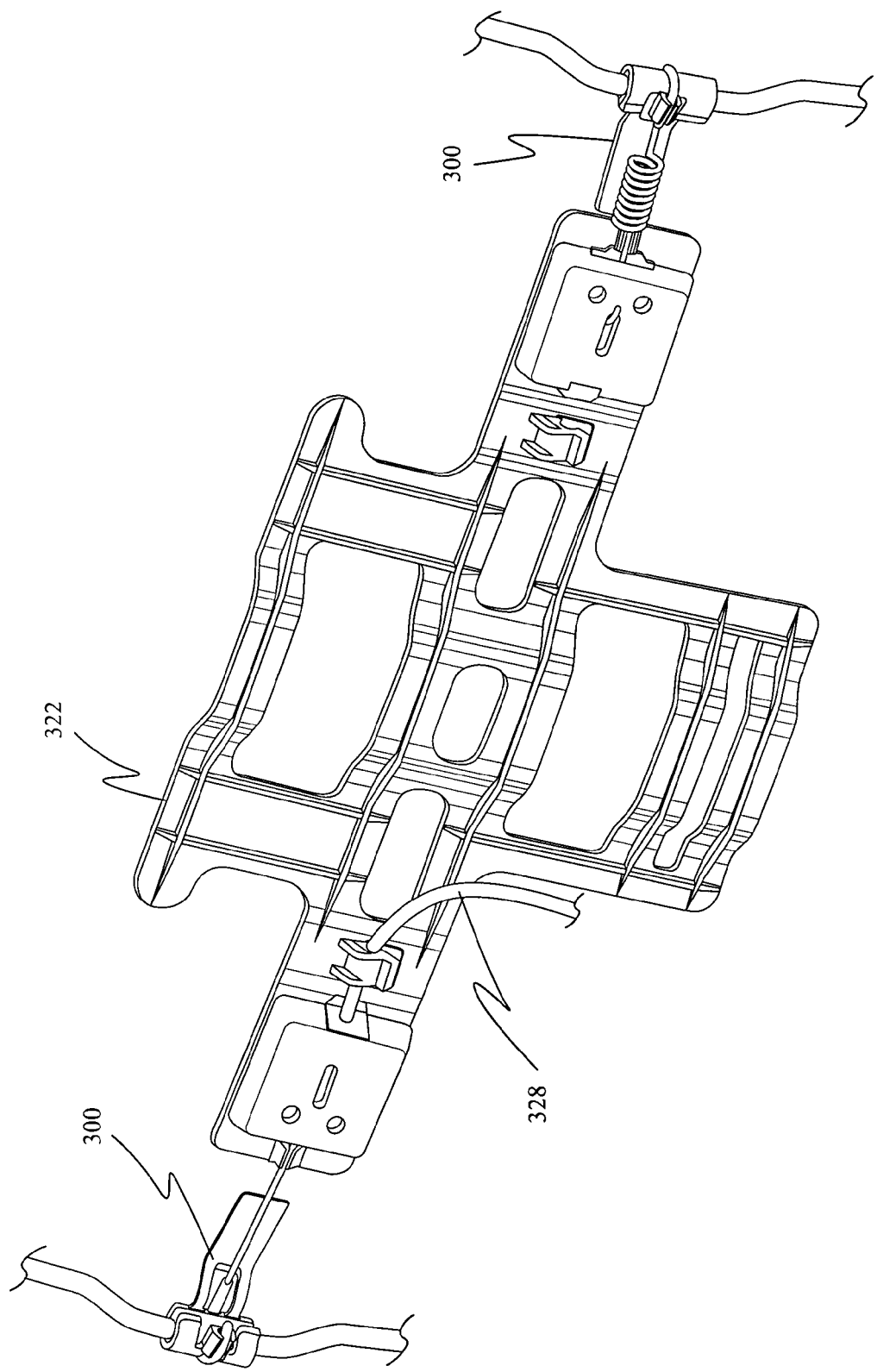
FIG. 26 illustrates a rear perspective view of the third embodiment of the belt extension member along with the belt lumbar support.

FIG. 26 illustrates a rear perspective view of the belt 322 and belt extension 300.

Figure 27:
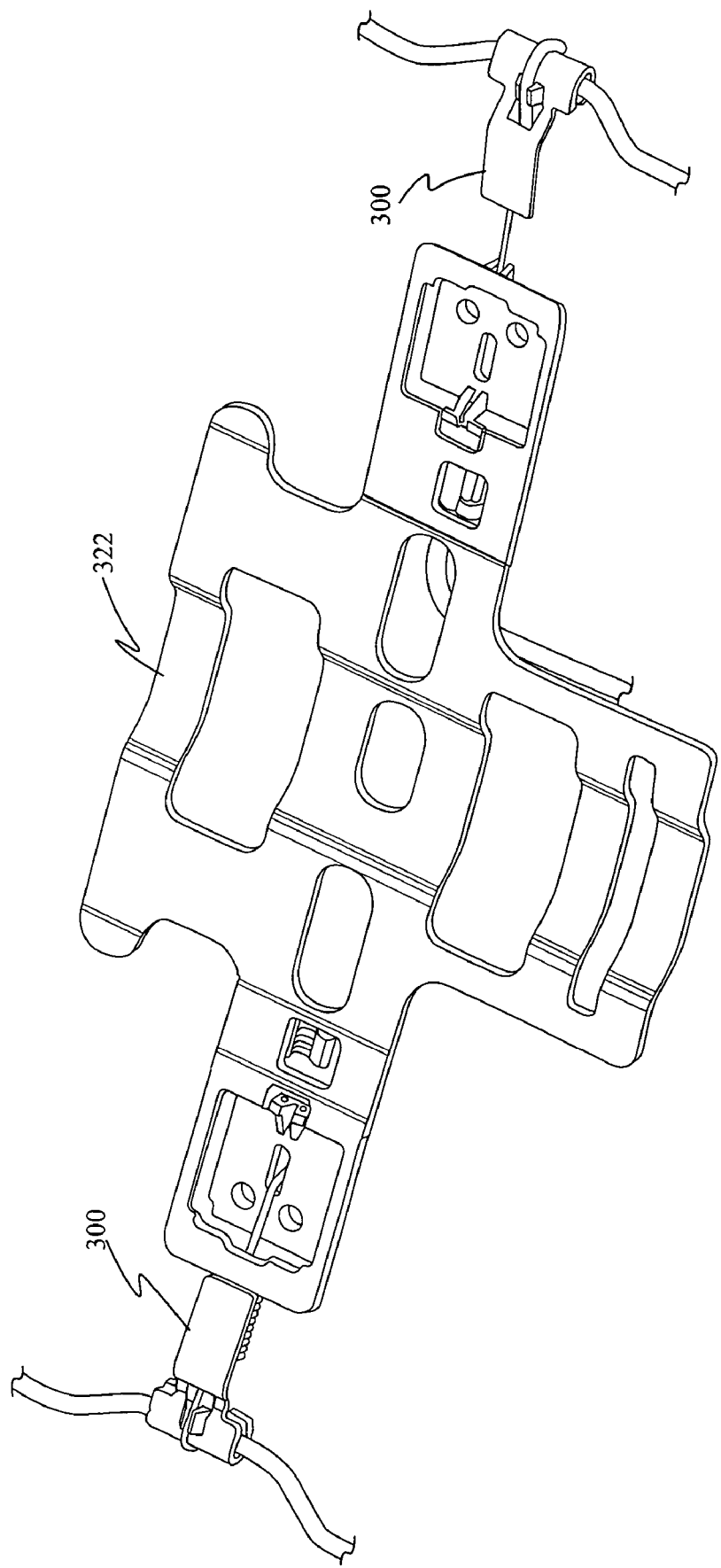
FIG. 27 is a front view of the belt shown in FIG. 26.

FIG. 27 illustrates a front perspective view of the belt 322 and belt extension 300.

Figure 28:
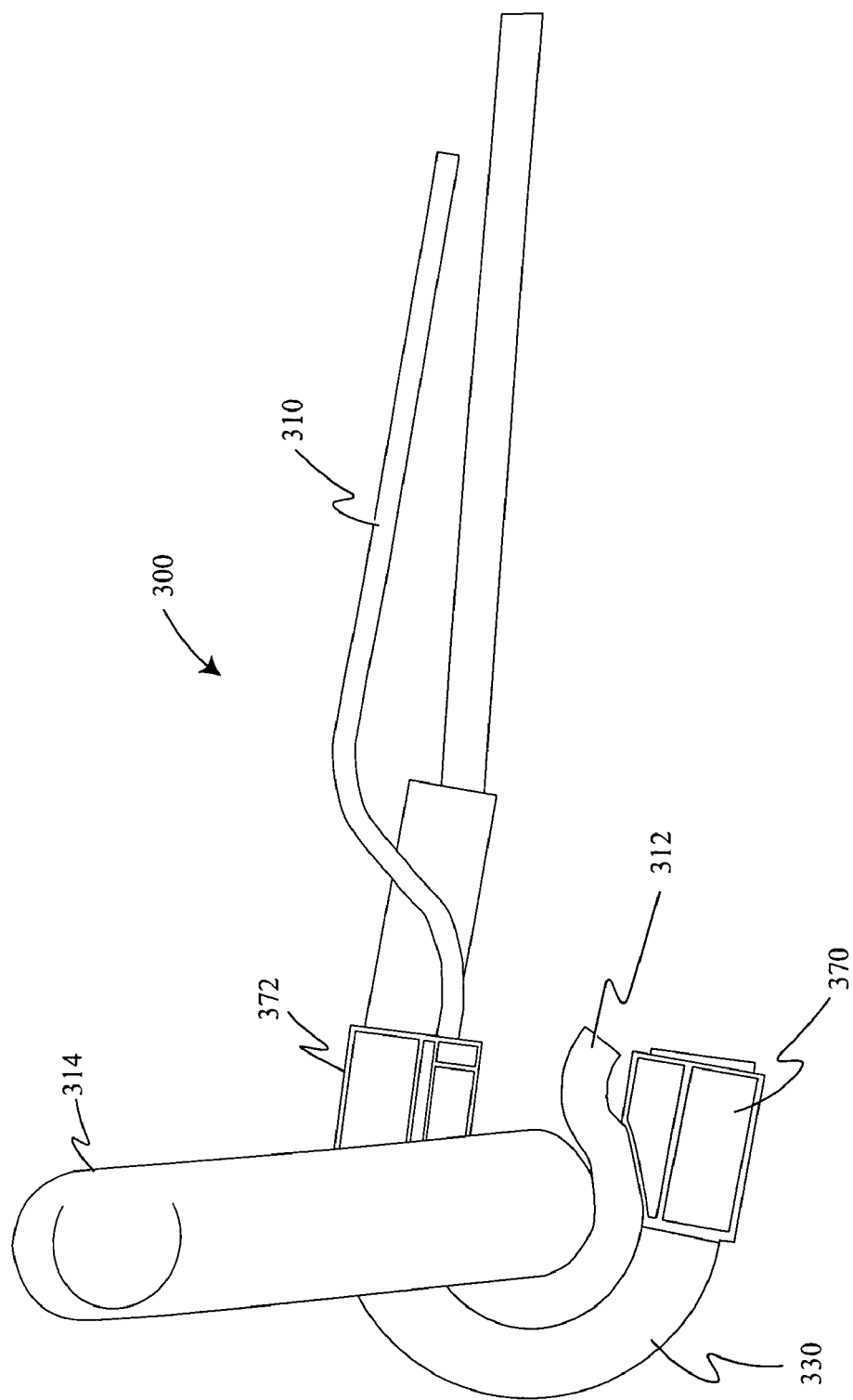
FIG. 28 is a bottom detailed view of the belt extension member of the third embodiment.

FIG. 28 illustrates a detailed bottom edge view of the belt extension 300. The belt extension 300 includes the attachment tab 312, and the belt tongue 310. Attachment tab 312 is connected to the wire support 314. The cable end 330 clips into both the first clip receiver 370 and the second clip receiver 372.

Figure 29:
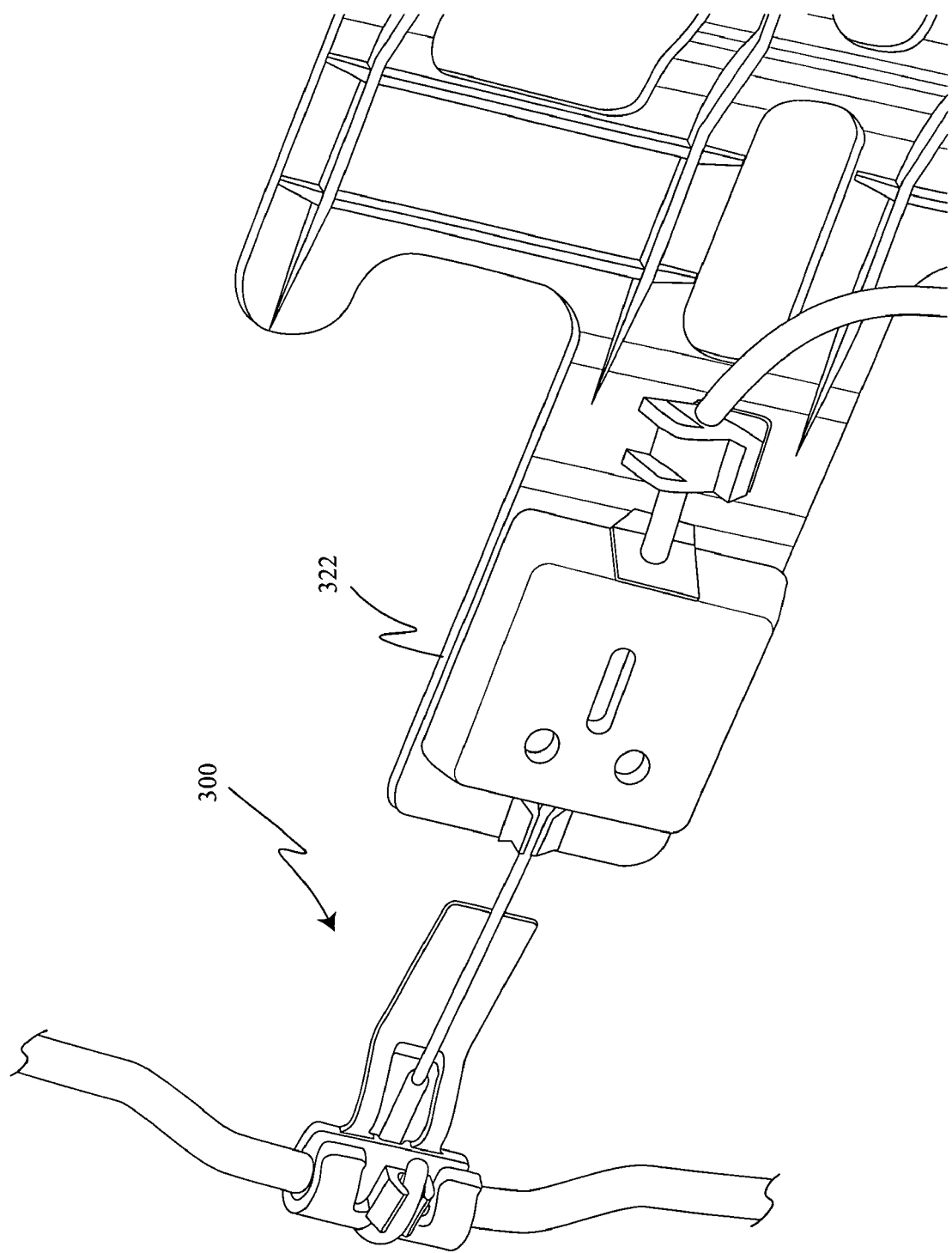
FIG. 29 is a rear perspective view of the belt extension member.
Figure 30:
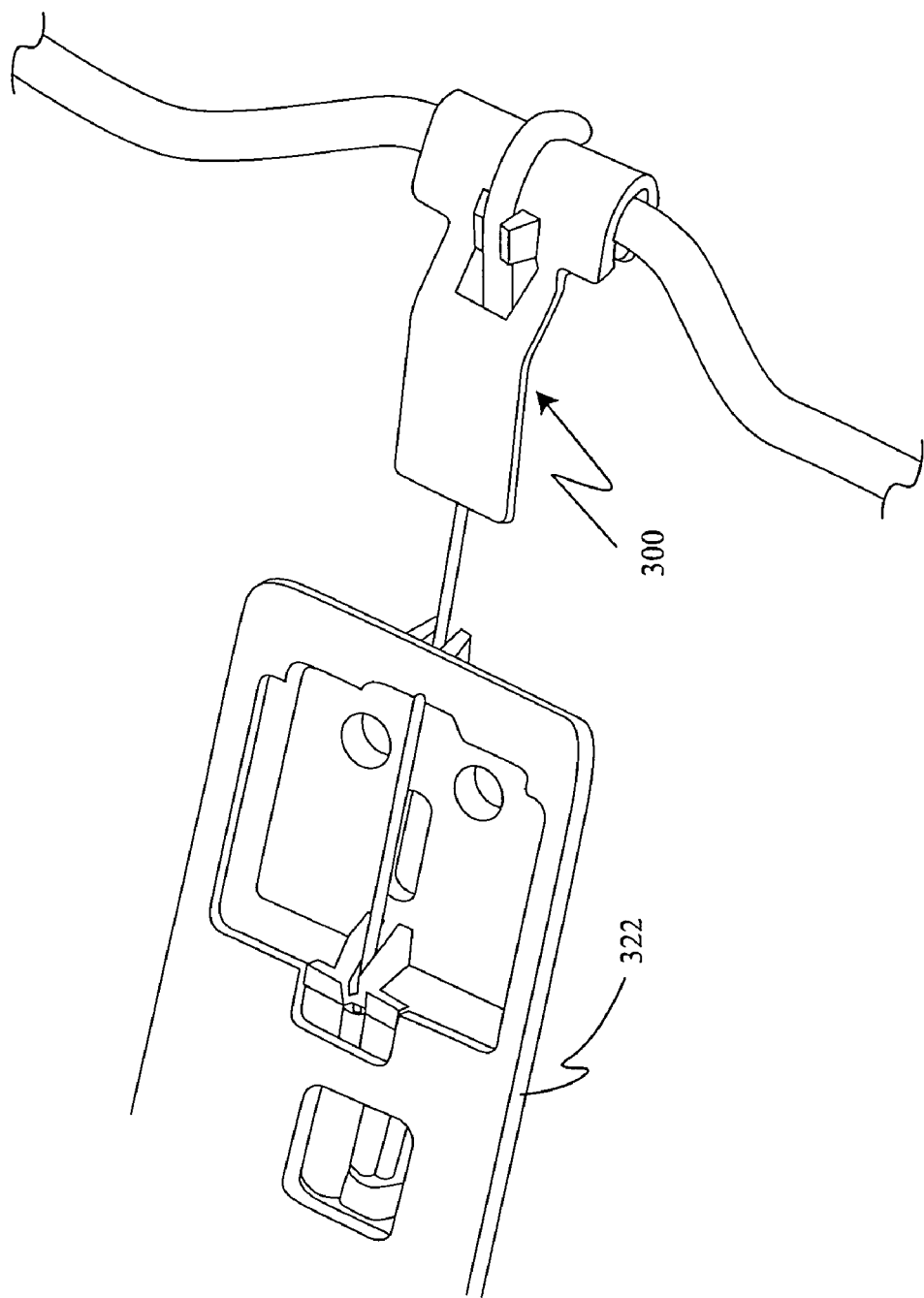
FIG. 30 is a front perspective view of the belt extension member.

FIG. 29 illustrates a rear perspective view of the belt 322 and the belt extension 300, while FIG. 30 illustrates a front perspective view of the belt 322 and the belt extension 300. The third embodiment of the belt extension 300 offers the advantage of protecting the seat back foam 140 from wear associated with rubbing of a spring or wire against the foam by situating the belt tongue 310 between the spring or wire and the seat back foam 140. However, unlike the other embodiments, this third embodiment of the belt extension 300 is less effective at preventing twisting of the belt 322.

Figure 31:
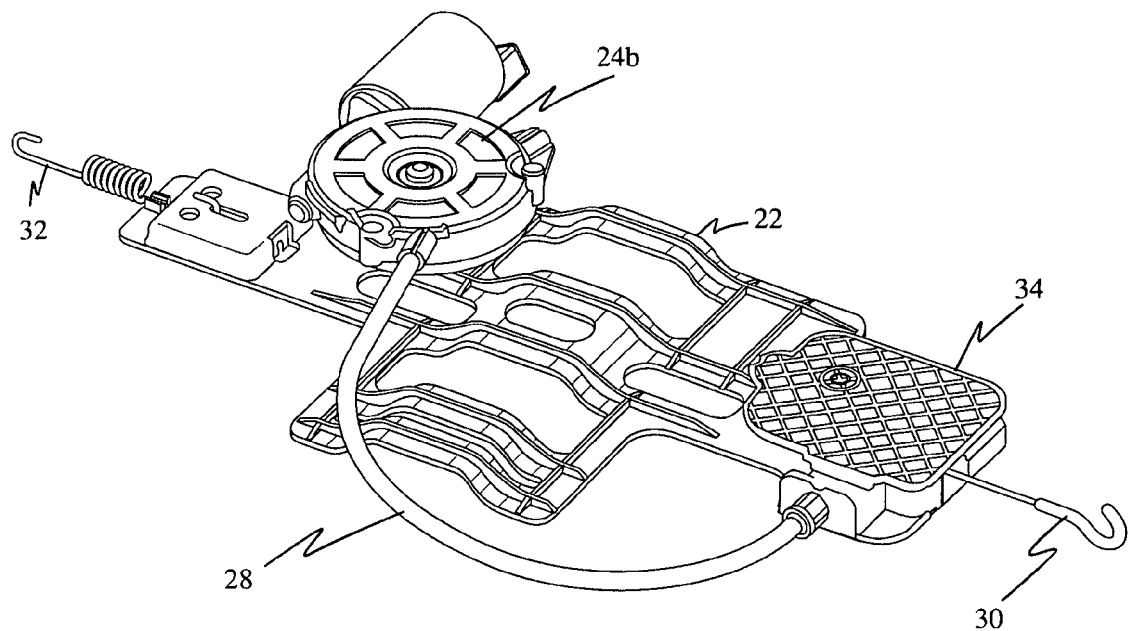
FIG. 31 is a top perspective view of a lumbar support in a first embodiment.
Figure 32:
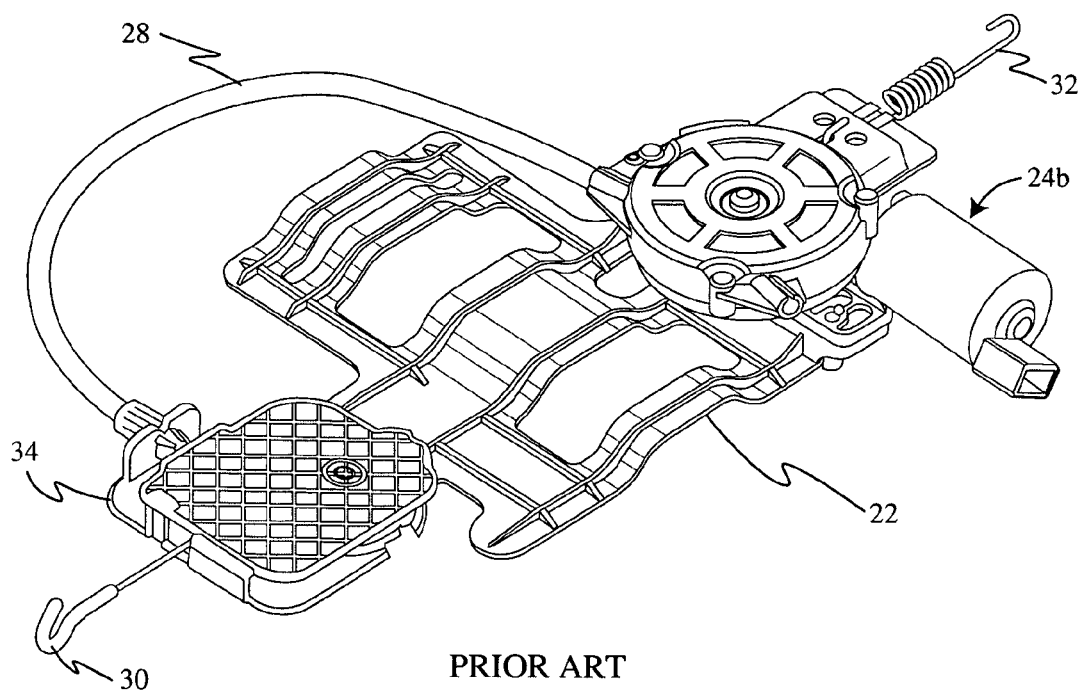
FIG. 32 is a bottom perspective view of the lumbar support shown in FIG. 31.

FIGS. 31 and 32 illustrate a first lumbar support. The lumbar support has a belt 22, an actuator 24b, a hook end 30, a wire spring 32, a transmission 34, and a cable 28 which connects the actuator 24b to the transmission 34. In operation, the actuator 24b is electrically engaged to apply a tractive force to the cable 28, while the cable 28 in turn applies a tractive force to the transmission 34, and finally the transmission 34 applies a tractive force to the cable end 30. The cable end 30 retracts and the lumbar support bows outwardly to provide increased support to a seat occupant. The belt extensions 200, 300 described herein that are separate, add-on components would attach to a lumbar support of the type shown in FIGS. 31 and 32.

Figure 33:
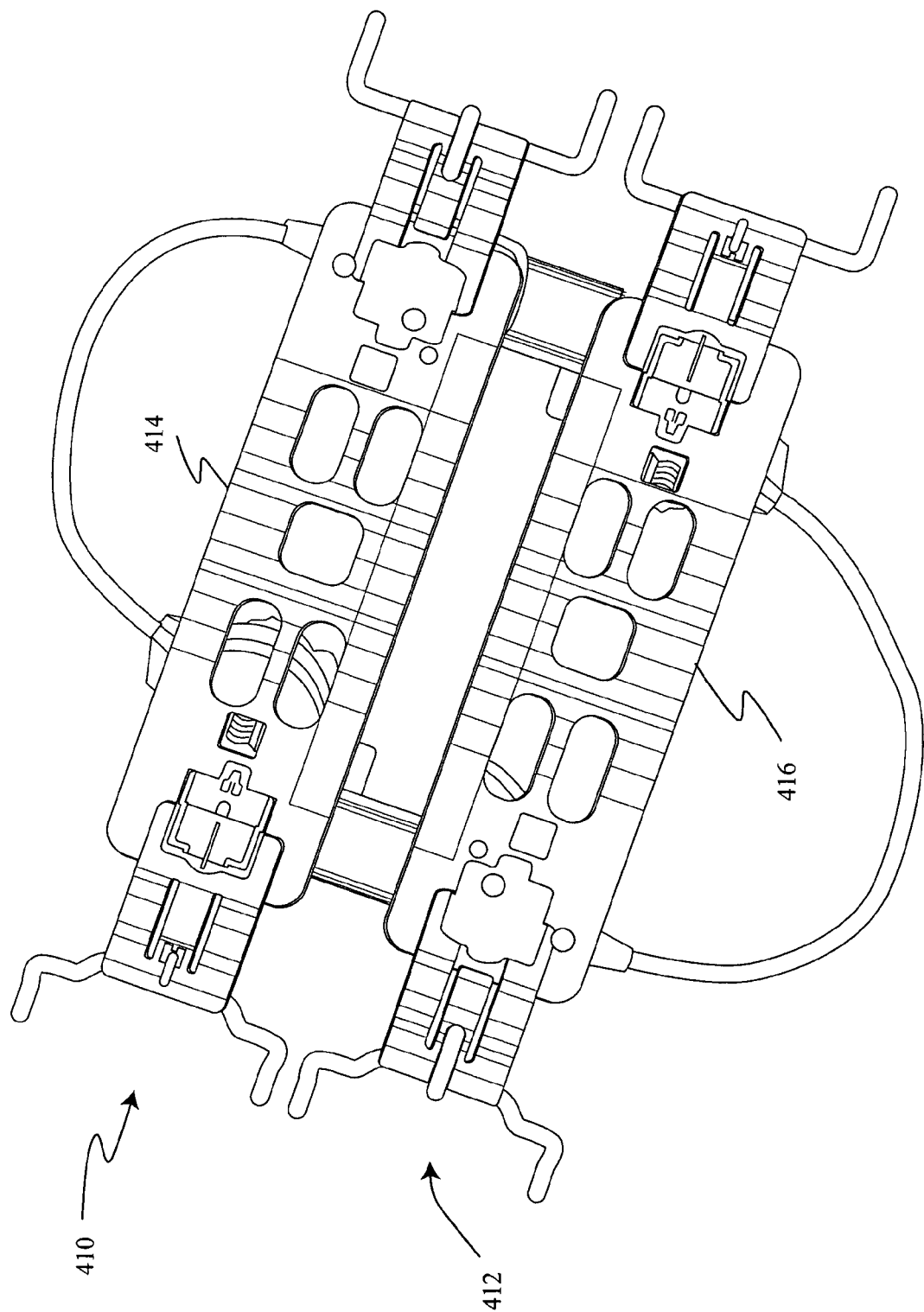
FIG. 33 is a front perspective view of a lumbar support in a second embodiment.
Figure 34:
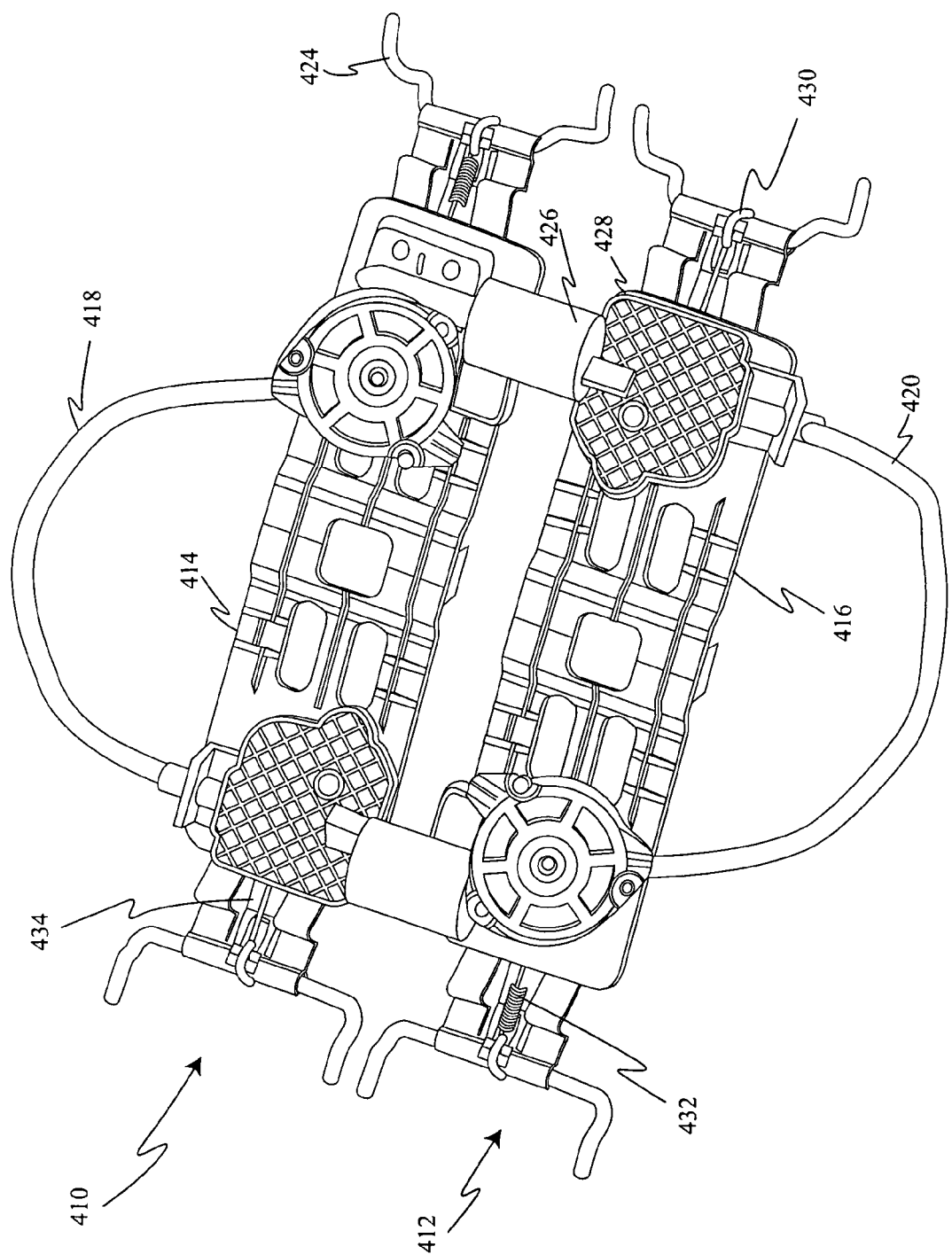
FIG. 34 is a rear perspective view of the lumbar shown in FIG. 33.

FIGS. 33 and 34 illustrate a second embodiment of the lumbar support generally indicated by numeral reference 400. The lumbar support 400 includes a first portion 410 and second portion 412. The first portion 410 includes a first belt 414. The second portion 412 includes a second belt 416. The first portion 410 includes a cable 418. The second portion 412 includes a second cable 420. Each portion 410, 412 includes an actuator 426 and transmission 428. The cables 418, 420 connect the actuator 426 to the transmission 428. Each portion 410, 420 also includes a cable end 430 and a spring 432. Each portion 410, 420 also includes wire supports 424. The wire supports 424 are used to mount the lumbar support 400 to a seat frame.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lumbar support adapted to mount within a seat frame, the lumbar support comprising:
   a belt having a first end portion and a second end portion;
   a first belt extension located at said first end portion, said first belt extension having a first attachment tab for attaching said first belt extension to a first wire support, and a first belt extension tongue attached to said first attachment tab, said first belt extension further having a receiver clip attached to said first attachment tab and a first receiver hole within a first hinge portion, said first belt extension tongue fitting within said first receiver hole; and
   a second belt extension located at said a second end portion, said second belt extension having a second attachment tab for attaching said second belt extension to a second wire support.

2. The lumbar support of claim 1, said first belt extension tongue moves within said first receiver hole.

3. The lumbar support of claim 1, wherein said second belt extension further comprises a second receiver hole and a second belt extension tongue, and wherein said second belt extension tongue moves within said second receiver hole.

4. The lumbar support of claim 1, further comprising:
   a spring located at said first end portion and operatively connected to said first attachment tab;
   a cable located at said second end portion and operatively connected to said second attachment tab;
   wherein said second belt extension further comprises a second belt extension tongue attached to said second attachment tab, wherein at least a portion of said first belt extension tongue extends over said spring; and wherein at least a portion of said second belt extension tongue extends over said cable.

5. The lumbar support of claim 4, wherein said belt further comprises a cup, and said first belt extension further comprises a protrusion adapted to mate with said cup.

6. The lumbar support of claim 5, wherein said cup includes a slot to receive an end of said spring.

7. The lumbar support of claim 1, wherein said second belt extension further comprises a second hinge portion.

8. The lumbar support of claim 1, wherein said first belt extension further comprises a first leg and a second leg, and said first leg and said second leg interconnect said first belt extension tongue to said first attachment tab.

9. The lumbar support of claim 1, wherein said first belt extension is mounted to said belt through the use of a fastener.

10. The lumbar support of claim 1, wherein said first belt extension further comprises an additional receiver clip.

11. A seat for a vehicle, the seat comprising:
    a seat riser mountable in the vehicle;
    a seat bottom mounted to said seat riser;
    a seat back mounted to said seat bottom, said seat back including a seat frame;
    a belt-type lumbar support operatively connected to said seat frame, said belt-type lumbar support having at least one tensioning member and a belt extension;
    wherein said at least one tensioning member has a first end portion and a second end portion;
    wherein said belt extension is located at said first end portion, said belt extension having an attachment tab for attaching said belt extension to a wire support, a first receiver clip attached to said attachment tab, a receiver hole within a hinge portion, and a belt extension tongue attached to said attachment tab, said belt extension tongue fitting within said receiver hole.

12. The seat according to claim 11, wherein said belt extension further comprises a first leg, and a second leg, and wherein said first leg and said second leg interconnect said belt extension tongue to said attachment tab.

13. The seat according to claim 11, further comprising an actuator and a cable, said cable having a first end connected to said actuator and a second end connected to said belt-type lumbar support.

14. The seat according to claim 11, wherein said seat frame further comprises a first mounting member and a second mounting member, and said belt-type lumbar support is operatively connected to said first mounting member and said second mounting member.

15. The seat according to claim 11, wherein said belt extension tongue moves within said receiver hole.

16. The seat according to claim 11, wherein said belt-type lumbar support further comprises a cup, and said belt extension further comprises a protrusion adapted to mate with said cup.

17. The seat according to claim 11, wherein said belt extension is mounted to said belt-type lumbar support through the use of a fastener.

18. The seat according to claim 11, wherein said belt extension further comprises a second receiver clip.

* * * * *